(12) United States Patent  (10) Patent No.: US 8,735,616 B2
Hassan et al.  (45) Date of Patent: *May 27, 2014

(54) PROCESS FOR UPGRADING LOW VALUE RENEWABLE OILS

(75) Inventors: Abbas Hassan, Sugarland, TX (US); Aziz Hassan, Sugarland, TX (US); Gregory Borsinger, Chatham, NJ (US)

(73) Assignee: H R D Corporation, Houston, TX (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/112,761

(22) Filed: May 20, 2011

(65) Prior Publication Data

US 2011/0287159 A1 Nov. 24, 2011

Related U.S. Application Data

(60) Provisional application No. 61/347,186, filed on May 21, 2010.

(51) Int. Cl.
*C07C 51/36* (2006.01)

(52) U.S. Cl.
USPC .......................................................... 554/141

(58) Field of Classification Search
USPC .......................................................... 554/141
See application file for complete search history.

(56) References Cited

U.S. PATENT DOCUMENTS

| | | | |
|---|---|---|---|
| 2,520,424 A | 8/1950 | Mills et al. | |
| 3,887,167 A | 6/1975 | Irwin | |
| 3,988,329 A | * 10/1976 | Zucker | 554/144 |
| 4,111,840 A | 9/1978 | Best | |
| 4,973,430 A | 11/1990 | Rivers, Jr. | |
| 5,538,191 A | 7/1996 | Holl | |
| 5,877,350 A | 3/1999 | Langer et al. | |
| 6,105,691 A | 8/2000 | Hayatdavoudi et al. | |
| 6,368,366 B1 | 4/2002 | Langer et al. | |
| 6,368,367 B1 | 4/2002 | Langer et al. | |

(Continued)

FOREIGN PATENT DOCUMENTS

| | | |
|---|---|---|
| GB | 1581910 | 12/1980 |
| GB | 2311785 | 10/1997 |

(Continued)

OTHER PUBLICATIONS

IKA-Rotor-Stator Generators—2003 Processing Catalog (38 pgs.).

(Continued)

*Primary Examiner* — Deborah D Carr

(74) *Attorney, Agent, or Firm* — Timothy S. Westby; Porter Hedges LLP

(57) ABSTRACT

Steps in the processing of oils derived from plants or vegetables include the degumming, deodorizing and bleaching of the oil before it can be used for further applications. By eliminating one or more of these steps from the processing of the oil, followed by hydrogenating the oil to a specified degree of hydrogenation, the resulting upgraded oils can be incorporated into products having commercial applications. The process uses a high shear mixing device and a hydrogenation catalyst. The process can utilize a single or multiple high shear devices, and utilize renewable oils instead of increasingly scarce petroleum based products. The resulting hydrogenated products may then be utilized in a variety of other commercial applications, such as to render cellulosic products water resistant, provide a coating for numerous cellulosic products, adhesive compositions, ink compositions, firelog compositions, drilling muds or asphalt modifiers.

17 Claims, 7 Drawing Sheets

Conventional Renewable oil processing

(56) References Cited

U.S. PATENT DOCUMENTS

| | | | |
|---|---|---|---|
| 6,383,237 | B1 | 5/2002 | Langer et al. |
| 6,530,964 | B2 | 3/2003 | Langer et al. |
| 6,742,774 | B2 | 6/2004 | Holl |
| 6,752,529 | B2 | 6/2004 | Holl |
| 6,811,824 | B2 | 11/2004 | Hassan et al. |
| 6,890,982 | B2 | 5/2005 | Borsinger et al. |
| 7,165,881 | B2 | 1/2007 | Holl |
| 7,267,743 | B2 | 9/2007 | Borsinger et al. |
| 7,538,237 | B2 | 5/2009 | Holl |
| 7,705,099 | B2 | 4/2010 | Hoskins |
| 7,910,758 | B2 | 3/2011 | Hassan et al. |
| 2002/0189159 | A1 | 12/2002 | Sprules et al. |
| 2005/0016062 | A1 | 1/2005 | Bonnell-Rickard et al. |
| 2005/0027136 | A1 | 2/2005 | Van Toor et al. |
| 2005/0131103 | A1 | 6/2005 | Hassan et al. |
| 2006/0021276 | A1 | 2/2006 | Sonnier |
| 2006/0196391 | A1 | 9/2006 | Hassan et al. |
| 2006/0289138 | A1 | 12/2006 | Borsinger et al. |
| 2008/0161588 | A1* | 7/2008 | Hassan et al. ............ 554/169 |
| 2010/0004419 | A1* | 1/2010 | Hassan et al. ............ 526/351 |

FOREIGN PATENT DOCUMENTS

| | | |
|---|---|---|
| JP | 57042763 | 3/1982 |
| JP | 2010090382 | 4/2010 |
| WO | 02064708 | 8/2002 |
| WO | 2009013328 | 1/2009 |
| WO | WO 2009/013328 A1 | 1/2009 |
| WO | 2009062925 | 5/2009 |
| WO | WO 2009/062925 A1 | 5/2009 |

OTHER PUBLICATIONS

Gogate, et al. "Cavitation: A technology on the horizon," Current Science 91, No. 1, Jul. 2006, pp. 35-46 (12 pgs.).
Office Action dated Jun. 25, 2009 for U.S. Appl. No. 12/142,447 (10 pgs.).
Office Action dated Jan. 7, 2010 for U.S. Appl. No. 12/142,447 (6 pgs.).
Office Action dated May 13, 2010 for U.S. Appl. No. 12/142,447 (5 pgs.).
Office Action dated Feb. 4, 2010 for U.S. Appl. No. 12/492,721 (5 pgs.).
Office Action dated Feb. 18, 2010 for U.S. Appl. No. 12/635,433 (6 pgs.).
Office Action dated Feb. 18, 2010 for U.S. Appl. No. 12/635,454 (6 pgs.).
Office Action dated May 14, 2010 for U.S. Appl. No. 12/137,441 (15 pgs.).
Office Action dated Feb. 19, 2010 for U.S. Appl. No. 12/144,459 (10 pgs.).
Office Action dated Sep. 2, 2009 for U.S. Appl. No. 12/142,433 (11 pgs.).
Office Action dated Jan. 29, 2010 for U.S. Appl. No. 12/142,433 (8 pgs.).
Office Action dated May 24, 2011 for U.S. Appl. No. 12/142,433 (10 pgs.).
Office Action dated Apr. 30, 2010 for U.S. Appl. No. 12/141,191 (12 pgs.).
Office Action dated Oct. 27, 2009 for U.S. Appl. No. 12/142,120 (15 pgs.).
Office Action dated May 5, 2010 for U.S. Appl. No. 12/571,537 (12 pgs.).
Office Action dated Feb. 24, 2011 for U.S. Appl. No. 12/796,358 (13 pgs.).
Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).
International Search Report and Written Opinion—PCT/US2011/037348, mailed Aug. 5, 2011.
S.D. Ukeles and B. Grinbaum, Drilling Fluids, Kirk-Othmer Encyclopedia of Chemical Technology, 5$^{th}$ edition, pp. 1-42 in vol. 9, 2005, John Wiley & Sons, Hoboken, NJ.

* cited by examiner

Figure 1 Conventional Renewable oil processing

Figure 2. Modified Renewable Oil processing without Degumming & Deodorizing

Figure 3. Modified Renewable Oil processing without Degumming, Bleaching and & Deodorizing

PROCESS FOR UPGRADING LOW VALUE RENEWABLE OILS

CROSS REFERENCES TO RELATED APPLICATIONS

This application claims the benefit of U.S. provisional patent application Ser. No. 61/247,186, filed 21 May, 2010, by the applicants, and whose contents are incorporated by reference herein in their entirety.

FIELD OF THE INVENTION

The present invention generally relates to a process in which renewable oils, such as low-grade vegetable and animal fats, are upgraded to more valuable products that can replace increasingly scarce petroleum based products in numerous commercial processes and products. Traditionally, the problem has been that these renewable oils have either been processed into usable commodities at relatively high cost; used "as-is" in low value fuel applications, and/or deposited in landfills as waste material. The present invention describes a process whereby these renewable oils can be converted, in a cost-effective manner, into usable products that have greater commercial value.

BACKGROUND OF THE INVENTION

Petroleum and petroleum-based products are widely used in various industrial processes, ranging from such uses as, for example only, fuels, waxes, and intermediates in the production of a number of products, such as polyethylenes and plastics. However, a problem with the use of petroleum and petroleum-based products is that their supply is dwindling, their price and supply is subject to fluctuation, and this is often affected by political and other factors that are outside of supply and demand matters.

On the other hand, products derived from plant and vegetable products, and animal products, are considered to be renewable products because plant and vegetable crops can be regularly cultivated, and animals can be raised in a similar manner. Because products derived from these sources can be regenerated, these products could also be considered to be "eco-friendly".

This invention relates to a process for upgrading low-grade renewable oils such as vegetable oils and animal fats, into products that can cost-effectively replace non-renewable petroleum based products. The low-grade, or low value oils are derived from several sources including spent frying oil, rancid oils, and vegetable oils that have been lightly processed. Reprocessed or recycled oils that would otherwise be considered substandard may also be utilized in this process. The low value renewable oils are processed by partial hydrogenation into solid waxes that can be used in value added applications such as water resistant coatings for materials such as boxboard, wood composites, oriented strand board and hardboard siding applications; water-resistant additive to gypsum and related products; use in emulsions for water resistant coatings; use in printing inks to reduce mar and rubbing of the applied ink; use in various types of adhesives, for example, hot-melt adhesives and adhesives used in packaging applications; use as a plastics processing aid, such as a lubricant for the extrusion of polyvinyl carbonate plastic; use in candle manufacturing; and use in fire logs and fire starter products. Yet another application for the renewable waxes of the present invention involves their use as an additive for the modification of asphalt.

The major processes for the hydrogenation of oils involves a number of steps in order to "clean up" the final product, and these include steps of degumming, deodorizing and bleaching the processed oil.

U.S. Pat. No. 7,910,758 B2 ("the '758 patent", the contents of which are incorporated by reference herein in their entirety), by several of these inventors and assigned to the same assignee as the present specification, describes many of the parameters involved in conventional hydrogenation processes. Generally, unsaturated triglycerides are refractory towards hydrogenation, and typically require high temperature, high pressure, prolonged hydrogenation time or combinations thereof in order to obtain satisfactory hydrogenation. Conventionally, unsaturated triglycerides are hydrogenated with hydrogen gas in the presence of at least 0.2 to 0.5% nickel hydrogenation catalyst, and sometimes a higher quantity of catalyst, at temperatures at or above 150 degrees C., and under pressures of from 60 psig to 100 psig or greater. Reaction times of at least 1 to 8 hours or longer are generally required, depending upon the degree of hydrogenation desired.

While advances have been made in catalyst chemistry, it has been difficult to accelerate the hydrogenation reaction itself. In the '758 patent, processes to accelerate the hydrogenation reaction, utilizing a high shear device, have been described. As will be described in the present specification, applicants utilize these processes for the preparation of partially hydrogenated products from what are considered to be "low-value", yet renewable oil products, which can then be utilized in the production of other commercially valuable products, rather than being discarded.

Among the potential uses for these upgraded oils produced by embodiments of the present invention are uses as coatings of cellulosic products to render them water resistant, or such uses as in the production of fire logs.

U.S. Pat. App. Pub. No. 2005/0016062 A1 discloses a fire log made of recycled materials, and a method for manufacturing such a fire log. The fire log comprises a solid fuel block that is oversaturated with a vegetable oil. The fire log is wrapped in a wax-coated wrapper.

U.S. Pat. App. Pub. No. 2006/0021276 A1 discloses an environmentally friendly fire log made of recycled materials, and a method for manufacturing such a fire log. The fire log includes a combustible material, a plant oil and a wax that are blended to form the fire log The combustible material includes wood fibers, sawdust and/or wood flour, the plant oil is a modified tall oil pitch residue, and the wax a polyethylene wax.

U.S. Pat. No. 6,811,824 B2, to the same assignee as the present specification, discloses use of fully hydrogenated vegetable waxes to render cellulosic articles, such as cardboard, boxboard, linerboard, and the like water resistant. The applied coating is also capable of being removed by immersion of the treated products in a warm, alkaline, aqueous solution, such that the treated products no longer need to be disposed of in a landfill, but can, instead, be recycled WO 2009/013328 A1 and WO 2009/062925A1 describe an additive package for modification of asphalt properties that includes a wax component including vegetable waxes. The examples utilize either Fischer-Tropsch or polyethylene waxes, and a vegetable wax mentioned (carnauba) is a costly material that is not readily available.

BRIEF SUMMARY OF THE INVENTION

The present inventors have developed a process in which renewable oils are upgraded to more valuable products that can replace increasingly scarce petroleum based products in numerous commercial processes and products. Traditionally, the problem has been that these renewable oils have either been processed into usable commodities at relatively high cost; used "as-is" in low value fuel applications, and/or deposited in landfills as waste material.

By modifying both the hydrogenation process, and the process for the preparation of the oil, these renewable oils can be converted, in a cost-effective manner, into usable products that have greater commercial value.

Embodiments of the process can utilize vegetable oils which have been prepared using a common preparation process that involves degumming, bleaching and deodorizing of the oil prior to a hydrogenation process.

Other embodiments of the process can utilize vegetable oils which have been prepared using a process in which one or more of the degumming, bleaching or deodorizing steps have been omitted prior to the hydrogenation process.

By eliminating one or more of these steps from the processing of the oil, followed by hydrogenating the oil to a specified degree of hydrogenation, the resulting upgraded oils can be incorporated into products having commercial applications. The process uses a high shear mixing device and a hydrogenation catalyst. The process can utilize a single or multiple high shear devices, and utilize renewable oils instead of increasingly scarce petroleum based products. The resulting hydrogenated products may then be utilized in a variety of other commercial applications, such as to render cellulosic products water resistant; provide a coating for numerous cellulosic products; adhesive compositions; ink compositions; firelog compositions; drilling muds; or asphalt modifiers.

DETAILED DESCRIPTION OF THE INVENTION

Figure 1:
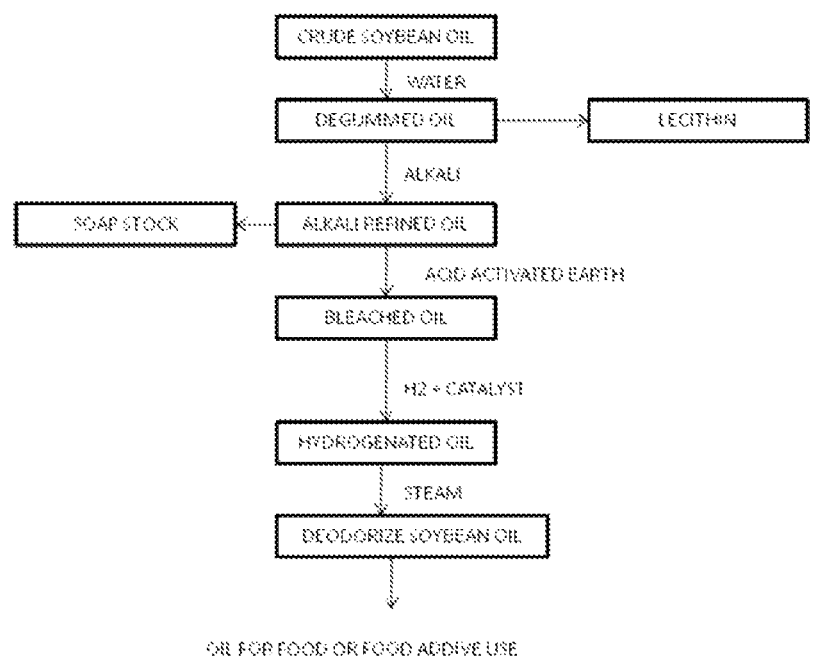
FIG. 1 is a schematic flow-chart illustrating a conventional process for hydrogenating a renewable oil.

Hydrogenated vegetable oil can be produced using conventional methods of vegetable oil refining and partial hydrogenation. For example, crude oil (extracted from the bean or other vegetable component) goes through a series of separation, reaction and bleaching stages to remove inedible and/or undesirable components such as free fatty acids, phosphatides, color and other miscellaneous impurities. The now refined and bleached vegetable oil is sometimes then partially or fully hydrogenated. The hydrogenation step changes the fluidity of the product from a pure liquid to a semi-solid or solid, and the amount of hydrogenation is characterized by the resulting iodine value ("IV") of the hydrogenated product. The hydrogenated oil is also then generally deodorized to remove odorous materials and other contaminants that are not suitable for human consumption.

Typical sources of vegetable oil, for example only, include the soya bean, rape seed, sunflower, safflower, palm, palm kernel, coconut oil, cottonseed oil, wheat germ oil, olive oil, corn oil, hemp oil, crambe, peanut, canola oil and oil derived from Jatropha plants. Other useful vegetable oils include canola oil, castor oil, coriander oil, hazelnut oil, hempseed oil, linseed oil, mango kernel oil, meadowfoam oil, palm olein, palm stearin, palm kernel olein, palm kernel stearin, peanut oil, rapeseed oil, rice bran oil, safflower oil and sasanqua oil (also known as tsubaki oil).

Examples of edible animal oils are fish oils such as those derived from the herring, pilchard, anchovy, krill, salmon, tuna, mackerel, shark and swordfish. Fish oils are generally derived from the tissues of oily fish, and other sources of fish oil include cod liver. Examples of edible animal oils include those obtained from seals and whales, and beef tallow and pig fat. Animal fats are also sometimes referred to as either lard or butter, in addition to the traditional reference to butter as a dairy product.

Depending upon the ultimate use of the upgraded oil, non-food oils such as Neatsfoot oil or other animal oils could be used in the processes embodied in the present invention.

Oils derived from various nuts and seeds, such as almonds, Brazil nuts, cashews, macadamia nuts, mustard seeds, pecans, pumpkin seeds, sesame seeds and walnuts could also be used, depending upon the ultimate use of the upgraded oil product.

For the present specification, these vegetable oils and animal oils shall be referred to as renewable oils due to the ability to replenish the oils through traditional farming and animal husbandry methods. These renewable oils can be defined, chemically, as triglycerides wherein a glycerine molecule has three fatty acid groups attached to it. The fatty acids are typically not uniform in composition and can include fatty acids having different carbon chain lengths and different degrees of unsaturation. Typical fatty acids include Myristoleic acid (C14:1); Palmitoleic acid (C16:1); Sapienic acid (C16:1); Oleic acid (C18:1); Linoleic acid (C18;2); α-Linolenic acid (C18:3); Arachidonic acid (C20:4); Eicosapentaenoic acid (C20:5); Erucic acid (C22:1), and Docosahexaenoic acid (C22:6), where the numbers in parentheses represent the carbon chain length, followed by the number of unsaturated double bonds present in the fatty acid.

Renewable oils intended for use as food or food additives must meet quality standards established by government regulations, as well as meet consumer preferences. Renewable oils that are discolored, unstable or contain compounds that provide undesirable odor and/or taste will render the renewable oil unsuitable for use as a food or food additive. Components harmful to human health such as residual pesticides must also be removed. Chemical reactions in renewable oils, such as those involving oxidation (leading to rancidity) or increased free fatty acid content, can render them unsuitable as a food or food additive. Hydrogenation of the oil is typically used to provide the renewable oil with chemical stability by eliminating some or all of the unsaturation of the fatty acid components of the triglyceride.

Renewable oils that are not suitable for use as a food or food additive are derived from a number of sources, including:

1. Lack of proper or complete processing of the renewable oil;
2. Oxidation and formation of color bodies and off flavor due to exposure to high temperatures such as occurs in frying operations;
3. Formation of undesirable and unhealthy cyclic ring structures in the fatty acids that can form between $C_{15}$ and either $C_{10}$ or $C_{11}$ to produce 5 or 6 member ring structures; and
4. Polymerization of the oil to form gums.

The term "off-grade renewable oils" will be used herein to describe renewable oils that are not suited for use as food or food additives. Significant quantities of off-grade renewable oils are produced in the cooking and frying of foods.

Traditionally, off-grade renewable oils have been disposed of by inclusion in animal feed, as fuel oil, and more recently as a feedstock for the production of biodiesel fuel. Off-grade renewable oil has also been disposed of in landfills due to lack of any economical outlet for its use.

Off-grade renewable oils have been derived by failing to completely process renewable oils, as has been described above, to a stage where they are suitable for use as a food or food additive. In the case of oil derived from soy beans, this might involve processing that does not properly deodorize or bleach the oil or omits other steps that would otherwise make the oil suitable for use as a food or food additive. Disposing of these off grade oils is problematic for oil producers, who have to pay for disposal of these oils if there is no commercial use for it, and there is thus an ongoing need to provide better economic outlets for off-grade renewable oils.

Utilizing soy oil as an example, soy oil that is intended for use as a food or food additive will go through several steps following extraction from the bean to make the oil suitable for use as a food or food additive (FIG. 1). Typical steps involve a degumming process, bleaching, deodorization and hydrogenation.

Degumming of soybean oil is done:
1) To produce soybean lecithin;
2) To provide a crude degummed soybean oil for long-term storage or transportation; or
3) To prepare a soybean oil suitable for physical refining.

The degumming process also removes phospholipids and other polar hydratable lipids. The removal of water-binding phospholipids may be advantageous in preventing spattering and drowning if the product is used for frying operations.

Alkali refining has little effect on the triglycerides of the oil, and thus on its principal nutritional function.

Figure 2:
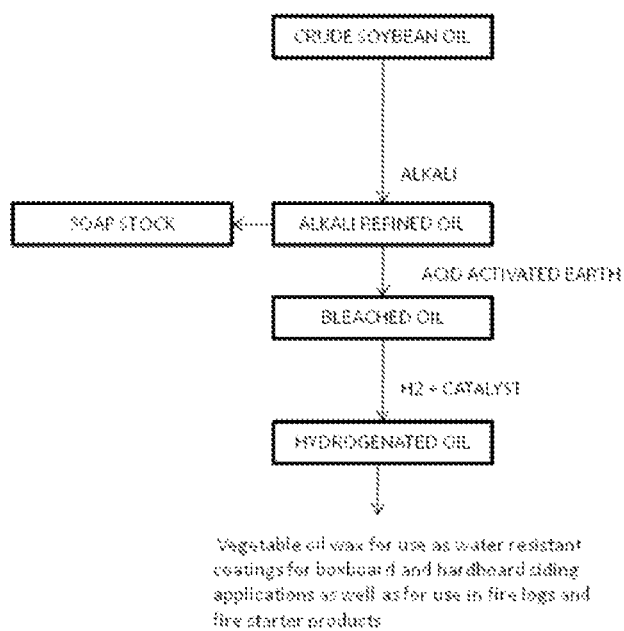
FIG. 2 is a schematic flow-chart illustrating a modified process for hydrogenating a renewable oil, without the degumming and deodorizing steps.

Alkali refining of crude soybean oil without degumming is also practiced where the gums are then disposed into soapstock (FIG. 2).

Bleaching of vegetable oils is normally done to remove plant pigments and is accomplished with the use of acid activated earth. Chlorophyll that is present in the oil can act as a poison to the catalysts commonly used in hydrogenation reactions. Color reduction of soybean oil can also be achieved by the combined effects of refining, hydrogenation, when employed, and deodorization.

Deodorization of soybean oil involves heating the oil to temperatures in excess of 210 degrees C. to 275 degrees C. and exposing to pressures of from about 1 to about 6 mm Hg for periods ranging from about 38 hours for a batch system and for about less than 1 hr for a continuous system. Steam is used to help strip the oil of impurities, in known steam stripping procedures. The removal of pesticides that would otherwise be detrimental to food, by either stripping or other processes, is an important factor in producing renewable vegetable oil for use in food and food additives.

Pesticides may be present in certain of the feedstocks used for the process of the present invention. However, the resulting hydrogenated "upgraded renewable oils" produced using the process of the present invention are useful in a variety of industrial products, as will be described further in this specification.

Embodiments of the present invention solve many of these problems by utilizing off-grade renewable oils in processes by which they can be made into useable compounds with high value added.

In addition to utilization of the off-grade oils that may be produced from frying and other processing operations described above, embodiments of the present invention can utilize oils derived from vegetables harvested under unfavorable weather conditions, or from the harvesting of unripe or otherwise damaged beans that would otherwise adversely affect the quality of the oil intended for use as a food or food additive. Although this adverse effect on oil quality can be partially offset by 'heavy' refining of the oil, this is accompanied by significant losses in yield. Utilizing embodiments of the present invention to process these oils can eliminate the need for such "heavy" refining, and may prevent the losses in yield associated therewith.

In addition to its use with food-grade oils, embodiments of the present invention can also include hydrogenation of non edible oils such as jatropha oil, castor bean oil and others, which can then be utilized in one or more additional industrial products or processes. Such oils have a relatively high percentage of fatty acid components with a carbon number greater than or equal to 18 and when fully hydrogenated yield a vegetable oil wax with relatively high melting points (i.e. greater than ~150 degrees F. (65 degrees C.) making them especially suitable for applications such as asphalt modification and hot melt adhesives. Higher temperature waxes are beneficial for use to prevent hot flow in asphalt shingles and to prevent tire rutting in asphalt paving compositions. In asphalt modification, wax additionally has the benefit of reducing viscosity and enabling better and faster coating of the aggregate with asphalt. In some embodiments the asphalt may also be oxidized to modify its properties.

As a result of the present invention, the "upgraded" renewable oils are suitable for use as water resistant coatings for products such as boxboard and hardboard siding applications, as well as useable in fire logs and fire starter products. To "upgrade" the renewable oils requires them to be hydrogenated to a solid form at room temperature and to have a sufficiently high melting point to avoid "blocking" (partial melting of the wax causing undesirable bonding of coated components). To achieve this proper hydrogenation requires that the crude vegetable oil be removed of compounds that would poison the catalysts used in hydrogenation, such as soaps and phosphatides. Consequently, the expenses associated with the equipment and the operation(s) of degumming and/or bleaching and/or deodorizing can be avoided using embodiments of the present invention.

One embodiment of the present invention provides a method for hydrogenating an unsaturated feedstock. In accordance with this method, an activated catalyst composition is produced by heating a nickel-based catalyst to a first temperature of at least about 60° C. in the presence of hydrogen and a fat component. In accordance with this method, a nickel-based catalyst is dispersed in the oil and hydrogen is delivered to the oil. The oil is hydrogenated for a hydrogenation time to yield hydrogenated oil having a modified Iodine Value and including modified fatty acid content The hydrogenated oil in this embodiment is solid at 25° C.

In other embodiments the hydrogenation can occur through the use of a high shear device followed by a fixed bed catalyst as described in the '758 patent.

Definitions

The terms "base oil", "renewable oil" or "low value oil" as used herein refers to oil which is substantially liquid at room or the temperature at which the oil will be used (for example, a cooking temperature), and has an iodine value that is greater than about 12. The base oil can be a nonhydrogenated oil or a partially hydrogenated oil, a modified oil, or a mixture thereof.

The term "saturated" as used herein is intended to include all triglycerides regardless of origin or whether they are solid or liquid at room temperature. The term "fat" includes, but is not limited to, normally liquid and normally solid vegetable and animal fats and oils The term "oil" as used herein is intended to refer to those fats that are liquid in the nonactivated state as well as to products comprising unsaturated carbon to carbon double bonds such as, but not limited to, crude oil. Such oils are obtained from petroleum and chemical processing operations as well as from vegetable based oils processing. Natural and synthetic fats and oils are included in these terms, although the part of this specification will be on those fats that are edible. Included within this group are fatty acids, which, for example, include long carbon chains, typically of lengths $C_6$ to $C_{20}$ The term "iodine value" or "IV" as used herein refers to the number of grams of iodine equivalent to halogen adsorbed by a 100 gram sample of fat. The iodine value is a measure of the unsaturated linkages in a fat. For the examples contained herein the iodine value can be determined by the AOCS Recommended Practice Cd1c-85.

The term "high shear" as used herein refers to rotor stator devices that are capable of tip speeds in excess of 1000 ft/min.

The term "normal" applies to gaseous material at a temperature of 20 degrees C. and a pressure of 1 atmosphere.

The term "multi-phase" as used herein refers to reactions involving reactions with two or more different phases.

The terms "saturated", "saturated fat", and "unsaturated fatty acids" as used herein refer to $C_4$ to $C_{26}$ fatty acids or esters containing no unsaturation, unless otherwise indicated. Fatty acid composition can be determined using AOCS Official Method Ce 2-66 (American Oil Chemists' Society (("AOCS")), Champaign, Ill.).

The term "tip speed" as used herein refers to the velocity (in ft/min or m/sec) associated with the end of one or more revolving elements that create the mechanical force applied to the reactants Hydrogenation Process The apparatus and criteria for hydrogenation have been described in U.S. Pat. No. 7,910,758 B2, by several of the applicants, and assigned to the same assignee as the present specification; the contents of the '758 patent are incorporated by reference herein in their entirety Catalyst for Hydrogenation of Fatty Acids In some embodiments, any catalyst known to those skilled in the art may be utilized for hydrogenation. In some embodiments, a catalyst may be employed to enhance the hydrogenation of fatty acids. For hydrogenation of unsaturated fatty acids, suitable catalysts may be any of the catalysts used for hydrogenation of unsaturated fats or fatty acids. These catalysts generally comprise one or more transition metals or compounds of one or more transition metals in a form suitable for hydrogenation. Catalysts comprising one or more metals from Group VIII or VIIIA of the periodic system of elements and/or one or more of their compounds may be used for the process. Such catalysts include, but are not limited to, copper-based and platinum-based hydrogenation catalysts. The metals iron, ruthenium, osmium, cobalt, rhodium, iridium, nickel, palladium and compounds thereof have proven to be particularly successful. For economic reasons, and also because of its efficiency, catalysts comprising nickel or one or more of its compounds may be particularly useful for use as a catalyst for the hydrogenation of fats, fatty acids and/or fatty acid derivatives.

In some embodiments, the catalyst employed is a transition metal catalyst fixed in an insoluble support. The insoluble support may be the type commonly employed in the catalytic hydrogenation of fats and fatty acids. In some embodiments, the catalyst is employed as a suspension in a small portion of the reaction product.

A suitable hydrogenation catalyst is, for example, NYSO-FACT® 120 (Engelhard Corporation, Erie, Pa.). NYSOFACT® 120 is a nickel silicate catalyst, with approximately 22% by weight Ni content. The catalyst is supplied as solid 'droplets' that are coated with a protective hydrogenated vegetable oil that has been hydrogenated to a point where the material is solid at room temperature. This hydrogenated oil coating serves as a protective barrier to reduce reaction of the catalyst with oxygen in the air. The protective barrier is removed in order to expose the active sites of the catalyst. Removal of the protective barrier can be effected by heating the protected catalyst to a temperature of from about 80 degrees C. to about 85 degrees C.

Preparation of Activated Catalyst

Figure 4:
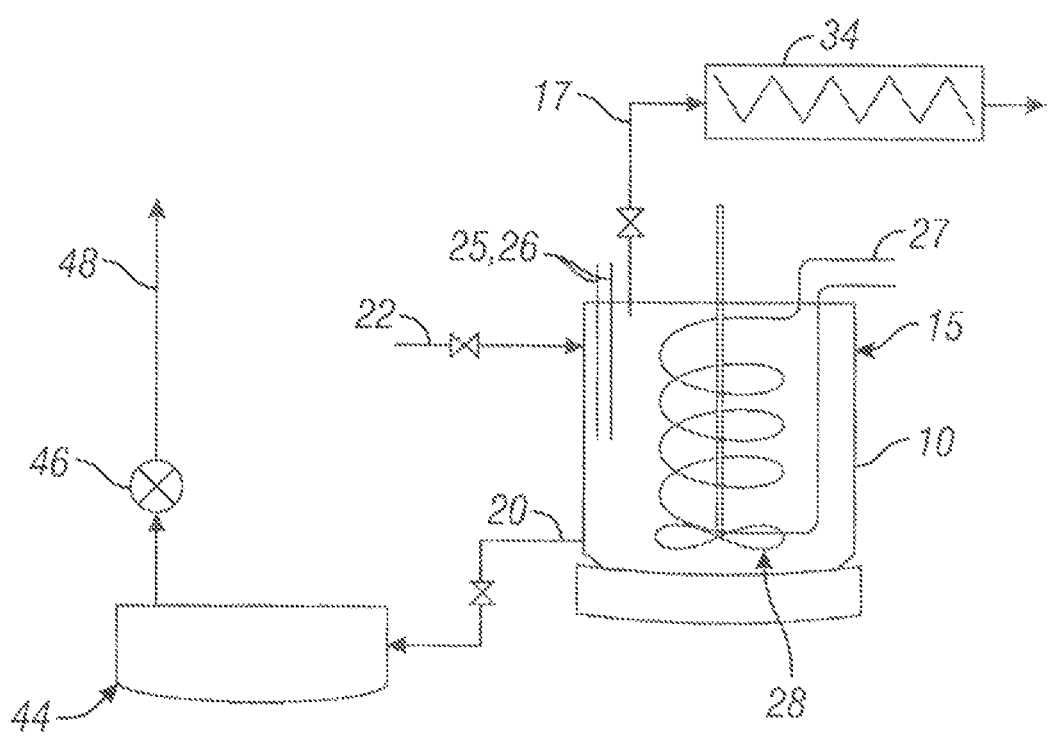
FIG. 4 is a schematic illustration of the reactor used in an embodiment of the present invention for producing an activated hydrogenation catalyst.

FIG. 4 illustrates the apparatus used to activate the catalyst. The NYSOFACT® 120 has to be activated prior to its use in hydrogenation. For example, one hundred grams (100 g) of NYSOFACT® 120 may be placed in a 500 ml reactor 10 which is then heated using a heating mantle 30. The catalyst is heated from ambient temperature to a temperature sufficient to melt the wax coating. In the case of NYSO-FACT®120 this temperature is 80 degrees C. Once the wax coating has melted the reactor 10 is sealed and hydrogen flow may be started. A second gas inlet valve 15 is used to allow other nonoxidizing gasses, such as nitrogen or hydrogen, for example, to be used in this step where the main purpose is to inhibit oxidation of the catalyst.

The reactor agitator 28 may be started and run at 1000 rpm for the remainder of the reaction time. Hydrogen gas at a temperature of 150 degrees C., pressure and flow rate of 5-3 SCHF (Standard cubic feet per hour) at 20 psi may be continuously added into the reactor for a period of 2 hours. Excess hydrogen and other volatiles may be removed from the reactor through a vent 17. In this embodiment, bleeding the reactor allows for removal of water that is formed as the hydrogen reacts with the catalyst to activate it.

Following 2 hrs at 150 degrees C. the reactor may be allowed to air cool to 100 degrees C. while maintaining hydrogen pressure (20 psi) in the reactor. In alternate embodiments, some cooling may be provided. The activated catalyst may then be transferred into a sealed drying dish 44 that is flushed with nitrogen and then kept under vacuum (from vacuum pump 46) all the time avoiding contact with any source of oxygen or moisture that can deactivate the catalyst. Reference numeral 48 represents gas flow.

The reactor 10 includes a discharge valve 20, inlet for the dispersible gas stream 22, a temperature probe 25, a pressure gauge 26, cooling coil 27, heating mantle 30, and condenser 34. The heating mantle 30 is used to heat the reactor 10, while cooling coil 27 could be used in conjunction with heating mantle 30 to maintain the reactor temperature at a specified temperature.

Condenser 34 can be used to recover excess hydrogen and other volatiles vented from the reactor 10.

Once cooled to room temperature the activated catalyst may be sized in a mortar and pestle to a fine powder suitable for use in hydrogenation. The catalyst may be sized to a size less than the minimum clearance between the rotor/stator in the high shear device. In embodiments, the catalyst is sized about 200 μm.

The increased activity resulting from the activated hydrogenation catalyst results in a reduction in the hydrogenation time and/or the production of hydrogenated products that comprise the desired hydrogenation level.

Figure 5:
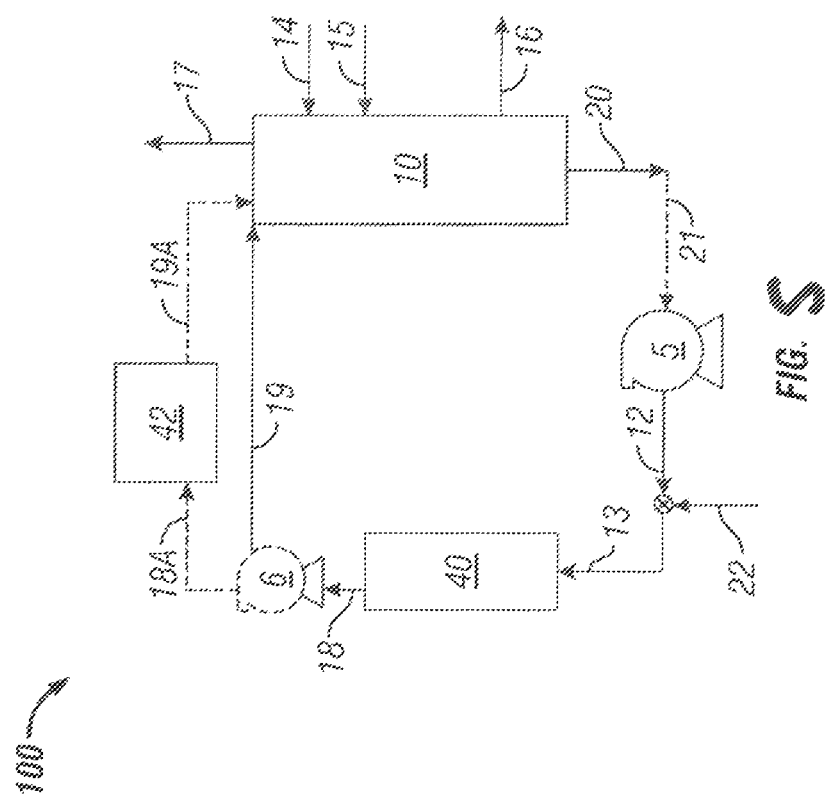
FIG. 5 is a general flow diagram of an embodiment of a high shear hydrogenation system comprising a high shear device.

Catalyst activated according to this method may be utilized in a conventional hydrogenation system, or may be incorporated into the high shear hydrogenation system of FIG. 5. in certain embodiments, conditions of high temperature and pressure along with high shear contacting of the renewable oil in liquid solution 21 and hydrogen gas 22 enable hydrogenation in the absence of a solid catalyst.

Heating/Cooling

The use of additional external or internal heating and/or cooling heat transfer devices is also contemplated in some applications of the processes of the present invention. With reference to FIG. 5, suitable locations for external heat transfer devices are between reactor 10 and pump 5, between pump 5 and high shear device 40 and/or between high shear device 40 and reactor 10. Many types of heat transfer devices, as known to those skilled in the art, are suitable, and examples of such exchangers are shell and tube, plate and coil heat exchangers.

Embodiments of the present invention utilize a commercially available nickel based catalyst as a starting material. Other commercially available nickel based catalysts such as a nickel-rhenium catalyst (described in U.S. Pat. No. 4,111,840, which is hereby incorporated by reference in its entirety) can also be utilized in the present invention.

Nickel catalysts are usually protected from exposure to air following their manufacture, because exposure to any oxidizing environment will cause oxidation of some or all of the catalyst's active sites, thereby rendering the catalyst less active in its ability to hydrogenate the carbon-carbon double bonds (C=C). Residual oxides have been found to remain in the nickel-based catalyst, even following storage using the best practices recommended by the manufacturer.

Prior art references utilize hydrogen as a pre-treatment to provide a more active nickel catalyst, but Van Toor et al. (U.S. Pat. App. Pub. No. 2005/0027136 A1) recognizes that certain reaction pressures and reaction times are above those used commercially.

In an embodiment of the present invention a commercially available nickel catalyst is treated such that the resulting activated catalyst has greater activity. FIG. 4 is a schematic of a system for activating a catalyst. The catalyst is activated by introducing a quantity of the catalyst in a reactor 10 with agitator 28 and heating mantle 30. The heating mantle 30 is utilized to heat the catalyst to a temperature at which any protective coating melts. In the case of NYSOFACT® 120 this temperature may be about 80 degrees C. Once the wax coating has melted the reactor 10 is sealed and hydrogen gas flow is started, for example, via hydrogen injection 16. A second gas inlet valve 15 is used to allow other nonoxidizing gasses, such as hydrogen or nitrogen, for example, to be used in this step where the main purpose is to inhibit oxidation of the catalyst.

Reactor agitator 28 is used to stir the reactor contents during activation. Other suitable mixing devices may be used, as known to those skilled in the art. In embodiments, reactor agitator 28 is operated at about 1000 rpm during activation.

The reactor can be selected from those commercially manufactured, and although these reactions could be performed in reactors ranging from 500 ml capacity to 10 liters capacity, other sizes could be used. In an example, the 500 ml reactor was obtained from Autoclave Engineers, Inc. (Erie, Pa.) and the 2 liter reactor from Parr, Inc. (Moline, Ill.). The 10 liter reactor was made by welding a section of 10 inch diameter stainless steel pipe with a base plate and a head plate equipped with an agitator shaft and seal.

A quantity of the base oil and the catalyst (and an organic solvent where indicated) may be placed into the reactor 10. A gas, such as nitrogen or hydrogen, for example, may then be used to fill the reactor 10, and purge it of any air and/or oxygen. The base oil is then heated to the specified reaction temperature, using the heating mantle 30.

The hydrogen gas may be fed into the reactor at ambient temperature, and gas flow regulated by means of a pressure relief valve (not shown) between the supply manifold (not shown) and the reactor 10.

For the hydrogenation reaction, the hydrogen used should be a purified gas, such as Purified Hydrogen Gas, Standard IS:HY 200, Grade II having a purity of 99.9% (+), and which can be obtained from Airgas Corp. Other gasses to be used should be of similar quality.

The hydrogenation reaction may then be carried out, maintaining the flow of hydrogen into the reactor, and maintaining the specified temperature for the indicated period of time. Because hydrogenation is an exothermic reaction, heating may be used initially to start the reaction followed by removal of the heating source. In larger reactors (2 liter and above) cooling coils may be used to maintain the desired temperature. At the end of the reaction, the heating mantle 30 may be removed, and the reactor cooled down by cooling coils or blowing air over the reactor and then stopping the hydrogen flow. During cooling a vacuum may also be drawn on the flask through a condenser cooled by water. This may also extract solvent where present The cooling process may then be stopped when the reactor temperature reaches ambient temperature (generally about 20 degrees C. to about 25 degrees C.), after which the hydrogenated reaction product may be removed from the reactor, and either its composition determined, or the hydrogenated reaction product may be used for further processing.

In embodiments, the hydrogenation process may be used to produce a hydrogenated product in which the iodine value ranges from 0 to about 150. In embodiments, the hydrogenation process may be used to produce a hydrogenated product in which the iodine value ranges from 0 to about 100. In embodiments, the hydrogenation process may be used to produce a hydrogenated product in which the iodine value ranges from about 10 to about 70. This range of iodine values for the reaction product is applicable to all systems in which the hydrogenated product is made, whether using a continuous or a batch process as described herein.

Hydrogenation Using High Shear Mixer: Batch Process

FIG. 5 (and the contents of the '758 patent, incorporated by reference herein) shows a hydrogenation system in which an external high shear mixer 40 is used, and which is positioned between the hydrogen source and the reactor 10. Using this system, the base oil, catalyst and hydrogen would be mixed in the high shear mixer 40 before the reactants are then introduced into the reactor 10 where the reaction is continued to be carried out over a time period sufficient to produce a hydrogenated product having a specified iodine value, after which the reaction is terminated. A pump 5 would be used to provide a controlled flow throughout the high shear mixer and throughout the system The system can employ a Dayton Pressure Booster Pump Model 2P372E, Dayton Electric Co (Niles, Ill.), but comparable pumps from other manufacturers could be utilized Continuous Hydrogenation Using High Shear Mixer Hydrogenation could also be performed using external high shear incorporation of hydrogen in a continuous process whereby hydrogen is introduced into a high shear mixing device with catalyst and unsaturated oil. The outlet of the high shear mixing device is connected to a vessel or tube sufficient to provide enough residence time to hydrogenate the oil to the desired IV value. The hydrogenated oil can be filtered and then directly fed into a transportation vessel or finished into forms such as flakes or other forms commonly known to those skilled in the art. Multiple high shear devices could be utilized to entrain hydrogen as needed for the desired reaction.

Multiple High Shear Devices

In some embodiments, two or more high shear devices such as HSD 140, or configured differently, can be aligned in series, and used to further enhance the reaction. Their operations may be either in a batch or a continuous mode. In some instances in which a single pass or "once through" process is wanted, the use of multiple high shear devices in series may also be advantageous. In some embodiments where multiple high shear devices are operated in series, vessel 110 may be omitted. In some embodiments, multiple high shear devices are operated in parallel, and the entire dispersions therefrom are introduced into one or more vessels 110.

High Shear Device

High shear hydrogenation system 100 comprises at least one high shear device 40. High shear device 40 serves to create a fine dispersion of hydrogen gas 22 in liquid solution 12 and also creates localized pressure and temperature conditions that promote hydrogenation. In high shear device 40, hydrogen gas and the base oil are highly dispersed such that nanobubbles and microbubbles of the hydrogen are formed for superior dissolution into the base oil solution.

As used in the present specification, a high shear device 40 is any high shear device capable of dispersing, or transporting, one phase or ingredient (e.g. liquid, solid, gas) into a main continuous phase (a liquid), with which it would normally be immiscible. The high shear device may use an external mechanically driven power device to drive energy into the stream of products to be reacted. The process of the present invention comprises utilization of a high shear mechanical device to provide rapid contact and mixing of chemical ingredients in a controlled environment in the reactor/mixer device. High shear mechanical devices include homogenizers as well as colloid mills as will be described further below.

External high shear device 40 is a mechanical device that utilizes, for example, a stator rotor mixing head with a fixed gap between the stator and the rotor. Dispersible gas stream 22 and liquid solution 12 are introduced separately or as mixed high shear device inlet stream 13 into the inlet of external high shear device 40. The high shear mixing results in the dispersing of hydrogen in micron- or submicron-sized bubbles. Thus, high shear device outlet dispersion stream 18 comprises a dispersion of micron- and/or submicron-sized hydrogen bubbles which, in certain embodiments, is introduced into reactor 10 as reactor inlet stream 19, after undergoing, optionally, further processing as may be desired in a particular application prior to entering the reactor 10. The streams 18, 19 and the contents of reactor 10 may be maintained at a specified temperature.

In one embodiment, high shear device 40 is enclosed, such that the pressure and temperature of the reaction mixture may be controlled. In certain embodiments, the use of a pressurized high shear device 40 enables the use of a reactor 10 which is not pressure controlled. As controlling the pressure of a larger volume of reactants is more capital intensive, the incorporation of high shear device 40 into high shear hydrogenation system 10 may reduce costs.

In some embodiments, high shear device 40 serves to intimately mix liquid solution 12 with gaseous dispersible reactant stream 22. In some embodiments, the resultant dispersion comprises microbubbles. In some embodiments, the resultant dispersion comprises bubbles in the submicron size, alternatively in the nanoparticle size It is known in emulsion chemistry that sub-micron particles dispersed in a liquid undergo movement primarily through Brownian motion effects. Without wishing to be limited to a particular theory to explain certain features or benefits of the present methods, it is proposed that sub-micron gas particles created by high shear device 40 have greater mobility thereby facilitating and accelerating the gas/liquid (and/or gas/liquid/solid) phase reaction through greater interaction of reactants.

Generally the dispersion comprises hydrogen bubbles having an average bubble size of less than about 5 μm. In some embodiments, the bubble size in dispersion 18 is from about 0.4 to about 1.5 μm. In some embodiments, the resultant dispersion has an average bubble size less than about 1.5 μm. In some embodiments, the resultant dispersion has an average bubble size less than about 1 μm. In some embodiments, the resultant dispersion has an average bubble size less than about 0.4 μm. In some embodiments, the high shear mixing produces hydrobubbles capable of remaining dispersed at atmospheric pressure for about 15 minutes or longer, depending upon the bubble size.

High shear mixing devices are generally divided into classes based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. There are three classes of industrial mixers having sufficient energy density to consistently produce mixtures or emulsions with particle sizes in the range of submicron to 50 microns.

Homogenization valve systems are typically classified as high energy devices. Fluid to be processed is pumped under very high pressure through a narrow-gap valve into a lower pressure atmosphere. The pressure gradient across the valve and the resulting turbulence and cavitation act to break up any particles in the fluid. These valve systems are more commonly used in milk homogenization and can yield average particle sizes in the 0-1 micron range.

At the other end of the spectrum are high shear device systems, classified as low energy devices. These systems usually have paddles or fluid mixers that run at high speed in a reservoir of fluid to be processed, which in many of the more common applications is a food product. These systems are usually used when average particle sizes of greater than 20 microns are acceptable in the processed fluid.

Between low energy-high shear devices and homogenization valve systems, in terms of the mixing energy density delivered to the fluid are colloid mills, which are classified as intermediate energy devices. The typical colloid mill configuration includes a conical or disk rotor that is separated from a complementary, liquid-cooled stator by a closely-controlled rotor-stator gap, which is commonly between 0.001-0.40 inches. Rotors are usually driven by an electric motor through a direct drive or belt mechanism. As the rotor rotates at high speed, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water based emulsion processing such as that required for cosmetics, mayonnaise, or silicone/silver amalgam formation, to roofing tar mixing. An approximation of energy input into the fluid (kW/L/min) can be estimated by measuring the motor energy (kW) and fluid output (L/min).

Tip speed is the velocity (ft/min or m/sec) associated with the end of the one or more revolving elements that is creating the mechanical force applied to the reactants. The high shear device should combine high tip speeds with a very small shear gap to produce significant friction on the material being processed. In some embodiments, the high shear device produces a local pressure in the range of about 150,000 psi and elevated temperatures at the tip of the shear mixer. For colloid mills typical tip speeds are in excess of 4,500 ft/min (23 m/sec) and can exceed 7,000 ft/min (40 m/sec). For the purpose of the present specification the term "high shear" refers to mechanical rotor stator devices (mills or mixers) that are capable of tip speeds in excess of 1000 ft/min and require an external mechanically driven power device to drive energy into the stream of products to be reacted.

In some embodiments, external high shear device 40 comprises a high shear colloid mill wherein the stator and rotor are disposed such that the maximum clearance between the stator and rotor is maintained at between about 0.001 inch and about 0.125 inch. In alternate embodiments, the process comprises utilization of a high shear colloid mill wherein the rotor and stator of the colloidal high shear device are disposed such that the minimum clearance between the stator and the rotor is maintained at about 0.060 inch. In some embodiments, the rotor is set to rotate at a speed commensurate with the diameter of the rotor and the desired tip speed. In some embodiments, the colloidal mill has a fixed clearance between the stator and rotor. Alternatively, the colloidal mill has an adjustable clearance.

In some embodiments external high shear device 40 comprises a high shear mill. In some embodiments, external high shear device 40 comprises a colloid mill. Suitable colloid mills are manufactured by IKA® Works, Inc., Wilmington N.C. and APV North America, Inc., Wilmington Mass., for example. In some embodiments in which a solid catalyst is sent through external high shear device 40, selection of the appropriate mixing tools may allow for catalyst size reduction/increase in catalyst surface area.

In certain specific embodiments, external high shear device 40 comprises a Dispax Reactor of IKA® Works, Inc, Wilmington, N.C. and APV North America, Inc., Wilmington Mass. Several models are available having various inlet/outlet connections, horsepower, nominal tip speeds. Output rpm, and nominal flow rate. Selection of high shear device 40 will depend on throughput requirements and desired bubble size in the outlet dispersion 18 from the external high shear device 40.

In some embodiments, transport resistance is reduced by incorporation of external high shear device 40 such that the velocity of the reaction is increased by a factor of about 5. Alternatively, the velocity of the reaction can be increased by a factor of about 10. In some embodiments, transport resistance is reduced by incorporation of external high shear device 40 such that the velocity of the reaction is increased by a factor of from about 5 to about 100 times.

In some embodiments, high shear device 40 comprises a single stage dispersing chamber. In some embodiments, high shear device 40 comprises a multiple stage inline dispenser. In other embodiments, high shear device 40 is a multistage mixer whereby the shear force varies with longitudinal position along the flow pathway, as further described below.

In some embodiments, high shear device 40 comprises two stages. In some embodiments, high shear device 40 comprises three stages. In some embodiments, each stage of the external high shear device has interchangeable mixing tools, offering flexibility. For example, the DR 2000/4 Dispax® Reactor of IKA® Works, Inc., Wilmington N.C. and APV North America, Inc., Wilmington Mass. comprises a three stage dispersing module. This module may comprise up to three rotor/stator combinations (generators), with choice of fine, medium, coarse and superfine for each stage. This allows for creation of dispersions having a narrow distribution of the desired bubble size. In some embodiments, each of three stages is operated with superfine generators.

Disperser IKA model DR 2000/4 is a high shear three stage dispersing device. Three rotors in combination with a stator are aligned in series to create the dispersion of hydrogen in liquid medium comprising base oil. Mixed high shear device inlet stream 13 enters the high shear device at a high shear device inlet and enters a first stage rotor/stator combination having circumferentially spaced first stage shear openings The coarse dispersion exiting the first stage enters the second rotor/stator stage, having second stage shear openings. The reduced bubble size dispersions emerging from the second stage enters the third stage rotor/stator combination having third shear stage openings. The dispersion exits the high shear device via a high shear outlet as high shear device dispersion outlet stream 18. In some embodiments, the shear force increases stepwise longitudinally along the direction of the flow For example, in some embodiments, the shear force in the first rotor/stator stage is greater than the shear force in subsequent stages. In some embodiments, the shear force is substantially constant along the direction of the flow, with the stage or stages being the same.

IKA Model DR 2000/4, for example, comprises a belt drive, 4M generator PTFE (polytetrafluoroethylene) sealing ring, inlet flange 1" sanitary clamp, outlet flange ¾" sanitary clamp, 2 HP power, output speed of 7000 rpm, flow capacity (water) approximately 300-700 L/h (depending on the generator), a tip speed of from 9.4-41 m/sec (about 1850 ft/min to 8070 ft/min). The rotor and stator of IKA model DR 2000/4 are cone shaped, and comprise three stages of increasingly fine serrations, or grooves. The stator can be adjusted to obtain the desired gap between the rotor and the stator. The grooves change directions in each stage for increased turbulence.

External high shear device 40 may comprise a PTFE seal which may be cooled by using techniques known to those skilled in the art. Liquid reactant, for example, liquid solution 12, may be used to cool the seal and thus be preheated as desired.

In some embodiments, high shear device delivers a certain amount of energy per volume/weight of fluid. In some embodiments, the high shear device delivers at least 300 L/h with a power consumption of 1.5 kW at a nominal tip speed of at least 4500 ft/min.

Once dispersed, the dispersion exits high shear device 40 as high shear device outlet dispersion stream 18 which may enter reactor 10 as reactor inlet dispersion stream 19. High shear device outlet dispersion stream 18 may undergo processing, such as heating, cooling, or pumping prior to introduction into reactor 10 as reactor inlet dispersion stream 19.

As further discussed below, in certain embodiments, much of the hydrogenation occurs between pump 5 and the high shear device outlet 18, and no discrete reactor 10 is incorporated into high shear system 100.

Figure 3:
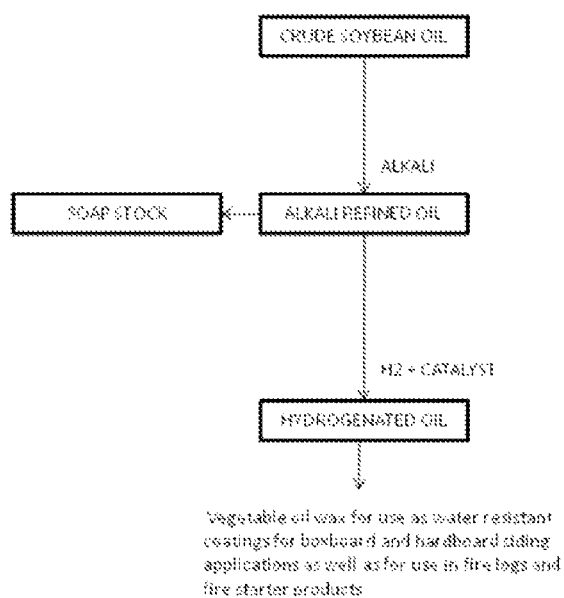
FIG. 3 is a schematic flow-chart illustrating a modified process for hydrogenating a renewable oil as shown in FIG. 2, and without the bleaching step.

Reaction rates can be further accelerated through a system configuration, such as that shown in FIG. 3 of U.S. Pat. No. 7,910,758 B2 (incorporated by reference herein in its entirety), where unreacted hydrogen gas 17 is separated in reactor 10 and recycled back to the inlet 32 of the high shear unit by means of a pump. In this way, a greater volume of hydrogen gas can be passed through the high shear unit without venting of excess hydrogen Reactor Hydrogenation of the fatty acids in base oil 12 will occur whenever suitable time temperature and pressure conditions exist, in the presence of catalyst. Therefore, conversion may occur at any point in the flow diagram of FIG. 5 where temperature and pressure conditions are suitable. A discrete reactor 10 is desirable in some reactions, however, to allow for increased residence time, agitation and heating and/or cooling In the '758 patent, we have determined that hydrogenation occurs primarily between pump 5 and the outlet of the high shear device 40, and in some embodiments, no discrete "reactor" 10 has been required.

In embodiments comprising vessel "reactor" 10, reactor 10 may be any type of reactor in which a multiphase reaction may continue. For example, a continuous or semi-continuous stirred tank reactor, or a batch reactor may be employed in series or in parallel. In some embodiments, reactor 10 is a tubular reactor. In some embodiments, reactor 10 is a multitubular reactor. The temperature in reactor 10 may be controlled using any method known to those skilled in the art. As much of the conversion may occur within high shear device 40, reactor 10 may serve primarily as a storage vessel in certain embodiments.

Reactor 10 may comprise fatty acid liquid feed inlet 14, inlet gas injection 15, and product removal stream 16. In embodiments, inert gas 15 is injected into reactor 10 (or elsewhere within high shear hydrogenation system 100) to enhance the hydrogenation.

Reactor 10 may further comprise temperature control (i.e., heat exchanger), stirring system, and level regulator, employing techniques known to those skilled in the art. In embodiments, reactor 10 may be selected from any number of commercially available reactors and may be of any suitable capacity. While laboratory scale reactors may range in capacity from 500 ml to 10 liters or more, commercial size reactors could be sized to 40,000 liters or greater.

Pump

In FIG. 5, external high shear device 40 is positioned between pump 5 and reactor 10. Pump 5 is used to provide a controlled flow throughout high shear device 40 and high shear hydrogenation system 100. Pump 5 builds pressure and feeds external high shear device 40. In some embodiments, pump 5 increases the pressure of the fatty acid stream 21 entering pump 5 to greater than 2 atm. In some applications, pressure greater than about 20 atmospheres may be used to accelerate hydrogenation, with the limiting factor being the pressure limitations of the selected pump 5 and high shear device 40.

When food grade requirements need to be met, all contact parts of pump 5 should be stainless steel, for example, 316 stainless steel. Pump 5 may be any suitable pump, for example, a Roper Type I gear pump (Roper Pump Company, Commerce, Ga.) Dayton Pressure Booster Pump Model 2P372H (Dayton Electric Co., Niles, Ill.).

High Shear Hydrogenation Process

As shown in FIG. 5, high shear hydrogenation system 100 may comprise pump 6 positioned after high shear device 40. In this embodiment, high shear hydrogenation system 100 comprises high pressure pump 6 for boosting the pressure into reactor 10 to accelerate the reaction still further. When pump 6 is incorporated as a booster pump, pump 5 may be used as a throttling pump/valve to reduce pressure in the high shear device 40, thus reducing the wear thereof.

Embodiments of the high shear hydrogenation system 100 comprise at least one high shear device 40 for increasing solubility of hydrogen gas in the liquid phase to accelerate the rate of gas/liquid or gas/liquid/solid reactions. FIG. 5 is a generalized schematic of a hydrogenation system 100 which comprises an external high shear device 40. High shear device 40 is positioned between pump 5 and reactor 10. FIG. 5 illustrates the system 100 as a closed system, wherein the outlet dispersion 18 from high shear device 40 is returned to reactor 10 for recovery of the product stream 16. This configuration is one that lends itself, for example, to multi-pass operation. When removed from the reactor 10, the product 16 may be passed to a product recovery system (not shown) for further processing.

Embodiments of the method comprise a process for the heterogeneous hydrogenation of any unsaturated oil including fats, fatty acids and/or fatty acid derivatives with hydrogen in the presence of a heterogeneous hydrogenation catalyst dispersed in the liquid phase in reactor 10. Embodiments of this process are characterized by the use of a high shear device 40 and introduction of hydrogen gas prior to introduction into high shear device 40.

In embodiments, the process comprises one external high shear device 40. The external high shear device 40 may be positioned between a feed reactant source and reactor/holding tank 10. In some embodiments, the reactor 10 is charged with catalyst and the catalyst activated as described above in this specification.

In these embodiments, reactants and, if present, catalysts (i.e., hydrogen gas, the base oil and catalyst) may be mixed in reactor 10. In these embodiments, the reactor 10 may be charged with the base oil and catalyst, and the mix heated under, for example, a hydrogen atmosphere. The slurry may be circulated through system 100 by pumps 5 and/or 6 and reactor outlet stream 20, pump inlet stream 21, pump outlet stream 12, high shear device inlet stream 13, dispersion 18, and reactor inlet stream 19. In alternative embodiments, reactants 18 exiting high shear device 40 are introduced into fluidized or fixed bed reactor 42 for catalysis.

The base oil feed stream 14 may be placed into pressure reactor 10 which may include an internal paddle reactor 28 (see FIG. 4) and/or a cooling coil 27 (see FIG. 4). Reactor 10 may also comprise a gas injection valve, temperature probe, pressure gauge, and/or heater. In some embodiments, reactor 10 comprises a continuous or semi-continuous stirred tank, and in other embodiments, hydrogenation is done in a batch process.

In embodiments, liquid solution comprising unsaturated fatty acids and optional catalyst are introduced separately into the reactor 10. In some embodiments, the liquid medium and catalyst are mixed prior to introduction into the reactor 10. In other embodiments, the liquid solution and catalyst are introduced separately and mixed within reactor 10 using a reactor agitator (see FIG. 4). Additional reactants may be added to reactor 10 if needed for a particular application. Reactants enter reactor 10 via, for example streams 14 and 15. Multiple inlet streams can be utilized, with two (streams 14 and 15)

shown in FIG. 5. For example, in embodiments with inert gas injection, the inert gas may be injected at gas injection 15.

In embodiments, any catalyst suitable for catalyzing a hydrogenation reaction may be employed. In embodiments, a gas such as nitrogen or hydrogen is used to fill reactor 10 and purge it of any air and/or oxygen. In embodiments, reactor 10 utilizes a hydrogenation catalyst.

In embodiments, hydrogenation reactor 10 may be charged with a catalyst and a base oil composition, and heated, as necessary, to allow the protective coating on the catalyst to liquefy. Alternatively, heating may take place under hydrogen flow.

In embodiments, heating is done to about 85 degrees C. In some embodiments, the time to melt the catalyst is about 10 minutes. In some embodiments, following melting at 85 degrees C. an additional amount of the base oil at a desired temperature is added over time to bring the resulting volume of oil to a specified temperature. For example, in some embodiments, following melting at 85 degrees C. an additional amount of base oil at 50 degrees C. could be added over a 1-2 minute period to bring the resulting volume of oil to a temperature of about 60 degrees C. Hydrogen is then continuously fed, in order to maintain the desired reaction pressure. The base oil is maintained at the specified reaction temperature, using the cooling coils in the reactor to maintain reaction temperature.

Following melting, an additional oil may be added over time to bring the resulting oil to a desired temperature, for example, 35 degrees C. Embodiments of the present invention could allow for hydrogenation of triglycerides at temperatures ranging from about 30 degrees C. Because hydrogenation is an exothermic reaction, heating may be used initially to start the reaction followed by removal of the heating source.

Next, high shear device 40 would be placed into operation, reactor agitation is continued, and the high shear pumping of reactor fluids throughout the high shear system 100 starts. The reactants are introduced into high shear device 40 and the reactants may be continuously circulated over a time period sufficient to produce a desired hydrogenated product, for example, a product having a specified property or property value, such as an iodine value, after which the reaction is terminated.

In embodiments, dispersible gas 12 is continuously introduced into high shear system 100. The dispersible hydrogen gas stream 12 is injected into high shear device gas inlet until the pressure in reactor 10 reaches a desired range. In embodiments, dispersible gas stream 22 is introduced into high shear device 40 until a pressure of, for example, 30 psi, is attained in reactor 10. In embodiments, dispersible gas stream 22 is introduced into high shear device 40 until a pressure of, for example, 200 psi, is attained in reactor 10.

Reactor discharge stream 20 is sent to pump 5. Pump 5 serves to introduce pump inlet stream 21 which is discharge stream 20 from reactor 10 which may or may not have undergone further treatment prior to pump 5 into external high shear device 40. Pump 5 is used to provide a controlled flow throughout high shear device 40 and high shear system 100. Pump 5 builds pressure and feeds external high shear device 40. In some embodiments, the pump 5 flow rate is in the range of from about 3 L/min to about 4 L/min in this manner, high shear hydrogenation system 100 combines high shear with pressure to enhance the intimate mixing of the reactants.

As shown in FIG. 5, the high shear hydrogenation system 100 may comprise pump 6 positioned after the high shear device 40. In this embodiment, high shear hydrogenation system 100 comprises high pressure pump 6 for boosting the pressure into reactor 10 to accelerate the reaction still further. When pump 6 is incorporated as a booster pump, pump 5 may be used as a throttling pump/valve to reduce pressure to the high shear unit 40, thus reducing the wear thereof.

In one embodiment, hydrogen may be continuously fed into the base oil stream 12 to form high shear device feed stream 13. Dispersible hydrogen gas 22 may be combined with pump outlet stream 12 at ambient temperature, and gas flow regulated by means of a pressure relief valve (not shown) upstream of high shear device 40. In some embodiments, dispersible reactant stream 22 is injected into high shear inlet stream 13 which comprises pump discharge stream 12 which optionally has undergone further processing prior to being sent to external high shear device 40.

In some embodiments, dispersible gas stream 22 is combined with liquid solution 21 and the combined gas/liquid (or gas/liquid/solid) stream 13 is introduced into high shear device 40. In other embodiments, high shear device 40 comprises a gas inlet and a liquid inlet, and the dispersible gas stream 22 and liquid solution in pump outlet 21 are mixed within the high shear device, rather than externally thereto. In some embodiments, especially with regards to larger reactor systems, it may be desirable to have a separate melt and mix vessel for preparing the catalyst that will then be pumped into the oil circulation stream at any point in the process, for example, the prepared catalyst may be added to high shear device feed stream 13, pump discharge stream 12, liquid solution 21, reactor 10, high shear device outlet dispersion 18, and/or reactor recycle inlet stream 19.

In high shear device 40 a fine dispersion of hydrogen in the liquid base oil is produced which accelerates the hydrogenation reaction and enables reaction at lower operating temperatures and pressures, thereby reducing the time of reaction significantly. In high shear device 40, hydrogen and the base oil are highly dispersed such that dispersion 18 from high shear device 40 comprises nanobubbles and microbubbles of hydrogen for superior dissolution of hydrogen 22 into the base oil solution. As mentioned above, it is known in emulsion chemistry that sub-micron particles dispersed in a liquid undergo movement primarily through Brownian motion effects. The kinetics of bubble motion through boundary layers, as is present on the surface of the catalyst, is thus enhanced and due to the formation of sub micron sized bubbles being formed in high shear device 40.

In embodiments, once dispersed, the hydrogen-base oil mix exit the external high shear device 40 as high shear device outlet dispersion 18. Stream 18 may optionally enter a fluidized or fixed bed reactor 42 in lieu of a slurry catalyst process. In some slurry catalyst embodiments, high shear outlet stream 18 directly enters the hydrogenation reactor 10 as reactor recycle inlet stream 19 where the hydrogenation reaction can propagate. Reactor recycle stream 19 is high shear device discharge stream 18 which optionally has undergone further processing prior to recycling to reactor W.

When catalyst is present in the charged system (as in a slurry reaction system) and temperatures and pressures suitable for inducing the hydrogenation reaction are present, hydrogenation can occur outside reactor 10. It is noted that a significant portion of the reaction may take place in high shear device 40. In some embodiments, when system 100 is operated such that conditions outside the high shear device 40 are not suitable to promote hydrogenation (e.g., suitable conditions of 35 degrees C. and 60 psi), greater than 90% of the reaction may occur within high shear device 40. In some embodiments, significant hydrogenation occurs between the pump 5 and outlet 18 of high shear unit 40.

If sufficient residence time exists within high shear hydrogenation system 100 to carry out the desired reaction, a reactor 10 may not be required in certain embodiments. In some embodiments, reactor 10 may be used mainly for cooling of fluid, since much of the reaction occurs in external high shear device 40. The base oil composition may be maintained at the specified reaction temperature by removing reaction heat from reactor 10 or elsewhere throughout system 100 using any method known to those skilled in the art.

In some embodiments, the reaction fluid is continuously circulated and the reaction continues over a time period sufficient to produce a desired product, for example, a hydrogenated product 16 having a specified iodine value, after which the reaction is terminated as known to those skilled in the art. The hydrogenation reaction may be allowed to propagate in reactor 10 maintaining the specified temperature for the specified period of time.

The cooling process is stopped when the reactor temperature reaches ambient temperature (generally about 20 degrees to about 25 degrees C.). The product stream 16 comprises the upgraded (hydrogenated) oil. Vent gas may exit reactor 10 through vent stream 17, while the hydrogenated product may be extracted from high shear system 100 via product stream 16. In some embodiments, the reactor 10 comprises a plurality of reactor product streams 16. The upgraded (hydrogenated) oil product 16 may be filtered and then fed directly into a transportation vessel, or finished into a liquid, or other forms, such as semi-solids or flakes, or other forms known to those skilled in the art, or used directly for the manufacture of other products.

In some embodiments, upon completion of the reaction, gas is removed from the product via reactor gas outlet 17. The reactor gas may comprise unreacted hydrogen, for example. The gas removed via the reactor gas outlet 17 may be further treated and/or recycled, using known techniques. In some applications the unreacted hydrogen removed via reactor gas outlet 17 is recovered and injected directly back into the inlet of high shear device 40 as a gas in dispersible gas stream 22.

Multiple high shear devices can be utilized to entrain hydrogen as needed for the desired reaction. In some embodiments, two or more high shear devices 40 are aligned in series, and are used to further enhance the reaction. Their operation may be in either a batch or continuous mode. In some instances in which a single pass or "once through" process is desired, the use of multiple (i.e., two or more) high shear devices in series may also be advantageous. The use of multiple high shear reactors may enable one pass hydrogenation to the desired degree of saturation. In some embodiments where multiple high shear devices 40 are operated in series, reactor 10 may not be employed. In other embodiments, multiple high shear devices are operated in parallel, and the outlet dispersions therefrom introduced into one or more reactors 10.

Figure 6:
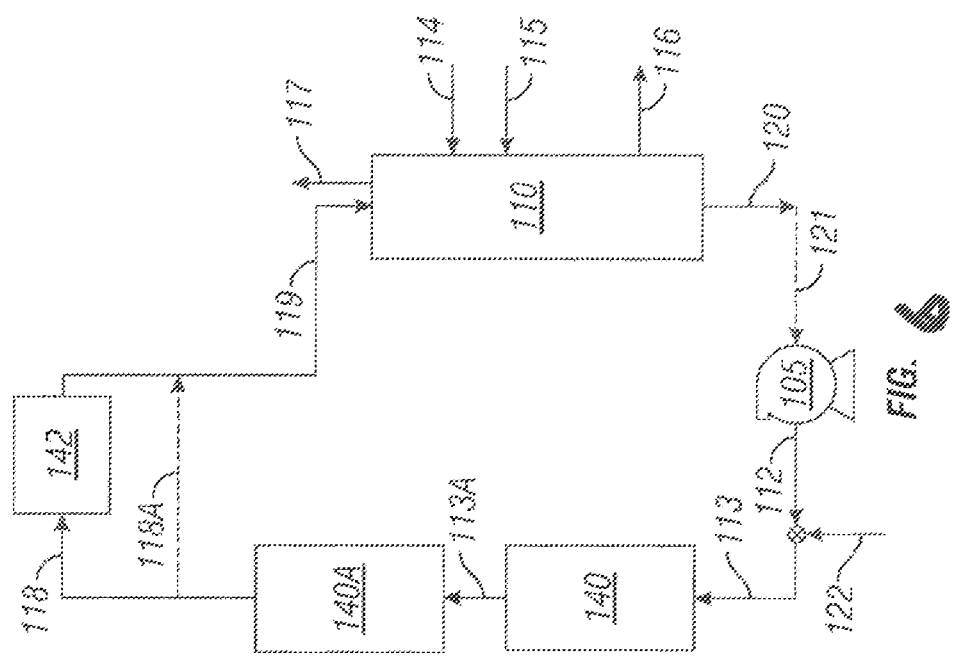
FIG. 6 is a flow diagram illustrating a high shear hydrogenation system that comprises two high shear devices.

FIG. 6 illustrates an embodiment of high shear system 100 where two high shear units 140 and 140A are utilized in series to further promote reactions. Multiple high shear devices 140 and 140A may also be utilized in conjunction with fixed catalyst bed reactor(s) such as fixed catalyst bed 142 in FIG. 5. FIG. 6 is numbered so that similar components have the same numbers as FIG. 4-5, but with 100 added thereto. For example, the number 118 is used to refer to the high shear dispersion outlet stream in FIG. 6, while 18 is used to refer to the high shear dispersion outlet of FIG. 4.

Operating Conditions
Temperature

The reaction may proceed under temperature and pressure conditions commonly employed in such catalytic reactions. In embodiments, the reaction temperatures are in the range of from about 60 degrees C. to about 260 degrees C. In some embodiments, operating conditions comprise a temperature in the range of from about 100 degrees C. to about 230 degrees C. In some embodiments, the reaction temperature is less than 220 degrees C. In some embodiments, the temperature is in the range of from about 160 degrees C. to about 180 degrees C. In some embodiments, the temperature is in the range of from about 155 degrees C. to about 160 degrees C. In some embodiments, such as where the process is being used for the production of low trans oils, the hydrogenation is effected at a temperature in the range of from about 25 degrees C. to about 60 degrees C. In other embodiments, the hydrogenation is effected at a temperature in the range of from about 30 degrees C. to about 40 degrees C.

Pressure

Reaction conditions used in the processes of the present invention are well known to those of ordinary skill in the art for the catalytic hydrogenation of unsaturated fatty acids, fats and derivatives thereof. Generally the hydrogen pressures are in the range of from 0.5 to 300 bar. In some embodiments, the reaction pressure is in the range of from about 2 atm to about 55-60 atm. In embodiments, reaction pressure is in the range of from about 8 atm to about 15 atm.

In embodiments, the operating pressure is less than about 1000 psi. In some embodiments, the operating pressure is less than about 500 psi. In some embodiments, the operating pressure is less than about 450 psi. In embodiments, the operating pressure is less than about 450 psi. In embodiments, the operating pressure is less than about 200 psi. In embodiments, the operating pressure is less than about 100 psi.

In some instances, it is desirable to further enhance the degree of hydrogenation. Increasing the reaction pressure increases the reaction rate, but also increases the wear on the materials comprising the reactor, the piping, the mechanical parts of the facility as well as on auxiliary devices The dissolution and/or dispersing provided by the external high shear mixing may allow a decrease in operating pressure while maintaining or eve increasing the reaction rate. The use of the high shear device may allow instantaneous conditions locally within the reaction mixture whereby hydrogenation of oils occurs under overall conditions of temperature and pressure under which hydrogenation would not conventionally occur.

The hydrogenation of oils is conventionally carried out at pressures in the range of from 60 pounds to 100 pounds per square inch and temperatures in the range of 100 degrees C. to 175 degrees C. over a period of several hours. External high shear device 40 is an enclosed unit wherein the temperature and pressure within the high shear unit(s) can be controlled, thus, when the process utilizes a high shear device, accelerated hydrogenation occurs at lower operating temperatures and pressures, thereby reducing the time of reaction significantly. The use of an external high shear device 40 is more economically favorable than a conventional mixer placed within a large reactor, whereby the maintenance of temperature and pressure of the entire large reactor unit (with an associated integrated/integral mixer) requires a greater capital investment in order to control the temperature and pressure of the larger reactor vessel. The instantaneous pressure and temperature conditions within the high shear device 40 also allow for hydrogenation under reduced temperatures that can reduce the formation of trans fats.

In embodiments, utilization of at least one high shear device 40 enables operation of reactor 10 at near atmospheric pressure. In some embodiments, the method and system of the present invention makes possible the design of a smaller and/or less capital intensive process than previously possible without the incorporation of the external high shear device 40. Thus, in certain embodiments of the present invention, capital costs for the design of new high shear hydrogenation systems are reduced relative to conventional (non high shear) hydrogenation systems. In alternative embodiments, the process of the present invention reduces operating costs and increases production from an existing process.

Time of Reaction

Use of the processes of the present invention comprising at least one high shear device 40 allow increased hydrogenation of oils and/or an increase in throughput of the reaction. In some embodiments, the process comprises incorporating external high shear device 40 into an established process, thereby making possible an increase in production (greater throughput) compared to a similar process operated without high shear device 40. In embodiments, the use of shear in hydrogenation of oils enables a reaction time that is less than half the time of conventional reaction times for producing products such as fully hydrogenated oils.

Gas Flow Rate

In embodiments, the gas-through flow of dispersible gas stream 22 is in the range of from about 1 to about 6 $Nm^3/hr$.

Hydrogenation Using Either a Slurry or Fixed Bed Catalyst

FIG. 5 illustrates a hydrogenation system that employs either a slurry or a fixed bed catalyst and described in Examples 7-10 of the '758 patent. (The contents of the '758 patent are incorporated by reference herein in their entirety; the '758 patent is assigned to the same assignee as the present specification.)

The system incorporates a high shear colloid mill/high shear device 40 in combination with an 8 liter vessel that acts as a reactor/holding tank 10. An external IKA MK 2000 mill (high shear device 40) registered trademark of IKA Works, Wilmington N.C. can be connected to the 8 liter stirred reactor.

In this system, external high shear device 40 may be positioned between the hydrogen source and reactor 10. The reactor 10 may be charged with catalyst and a quantity (for example, 1 liter) of raw soy oil and heated to 85 degrees C. (using a heating mantle) to allow the coating on the catalyst to dissolve. Care should be taken to avoid any oxygen contact with the catalyst Hydrogen gas may be introduced into the system, and heating to 85 degrees C. could take approximately 10 min. Following melting at 85 degrees C., and additional quantity (for example, 7 liters) of raw soy oil at 25 degrees C. may be added over approximately 1-2 min to bring the resulting quantity (8 liters) of oil to 35 degrees C.

The reactants may then be introduced into high shear device 40 where the oil may be continually circulated and the reaction continued over a time period sufficient to produce a hydrogenated product having a specified iodine value, after which the reaction may be terminated. The reactor may be equipped with an external gear pump 5 to allow for circulation of the oil/catalyst through high shear hydrogenation system 100. Reactor 10 may be equipped with an internal water cooling coil for controlling reactor temperature during the exothermic hydrogenation reaction Injection of hydrogen 22 to high shear device 40 will be at the high shear inlet 13. The dispersion 18 of the high shear device 40 may be introduced into the 8 liter stainless vessel 10 that would be operated at room atmospheric pressure Flow through the high shear device 40 may be controlled by a gear pump 5 with suction gravity fed from the 8 liter stainless vessel 10 and discharged into the inlet 12 of high shear device 40. The inlet pressure to high shear device 40 should be approximately 200 psi.

Once the reactor will reach 35 degrees C., hydrogen gas may be continuously added to maintain the specified pressure. The reactor temperature may then be cooled to maintain a temperature of 35 degrees C., and the reaction products would be either analyzed for their composition or subjected to further processing.

The iodine value of the raw oil would be compared to the iodine value of the reaction product, to determine the extent of hydrogenation.

Hydrogenation Using a Fixed Bed Catalyst and High Shear.

The fixed bed design uses fixed bed catalyst reactor 42. The fixed bed catalyst enclosure 42 could be a Titan Simplex Basket Strainer (Titan Co., Lumberton N.C.) Model HS 35-SS (SA6767C) packed with 230 grams of Sud Chemie NiSat 310 RS catalyst (Sud-Chemie Inc., Louisville, Ky.). Mesh would be fitted to the top of the basket and a lock ring fabricated to hold the mesh in place thus maintaining the catalyst in the fixed bed catalyst enclosure.

The Titan Basket Strainer 42 would be piped into the system between the high shear unit 40 and the stirred reactor 10. A by-pass 90 can be mounted around the fixed bed catalyst enclosure 42 to regulate flow through the catalyst upon start up and shut down of the system.

To initially activate the fixed bed catalyst 42, a quantity (for example, 8 liters) of base oil may be added to the reactor 10. In order to remove the system of oxygen, a full vacuum may be applied to the entire system 100. The system 100 may then be purged with a gas such as nitrogen, and the process of applying the vacuum and then purging the system with a non-oxygen containing gas may be repeated. After the second purging the 1 inch stainless steel valves in the inlet and outlet may be closed to isolate the catalyst in the fixed bed. Full vacuum may then be applied to the system 100 a third time, followed by nitrogen purging. Pure hydrogen 22 may then be introduced and the valves on the inlet and outlet of the strainer basket may be fully opened and the bypass 19 closed. The high shear unit 40, gear pump 5, reactor 10 stirrer may then be started. The system may then be maintained at a temperature of 150 degrees C., and with a constant hydrogen pressure of 60 psi for a desired period of time, such as, for example, 4 hours. After the desired period of time, the system may be shut down after the catalyst has been activated.

Hydrogenation Process

A quantity (for example, 8 liters) of fresh base oil may be added to the reactor 10. A vacuum may be pulled on the reactor for a specified time period, such as 30 minutes and the oil may be heated to the reaction temperature of 150 degrees C. while the pump 5 and high shear unit 40 are started. Hydrogen gas 22 may be introduced until the pressure of the reactor 10 reaches 100 psi and the pressure of pump discharge 12 from pump 5 is 225 psi. Hydrogen flow 22 should be controlled to maintain the reactor pressure while a small volume of gas (1-2 bubbles/sec through a ⅛ inch diameter copper tube) may be allowed to vent through reactor outlet 17. The hydrogen feed 22 is maintained for a specified period, for example, 2 hours, 20 minutes, and then discontinued along with pump 5 and high shear device 40 and the pressure then reduced to atmospheric on the system 100. The hydrogenated upgraded oil may then be allowed to cool to room temperature prior to further analysis of the end products.

Heat Transfer Devices

In addition to the previously mentioned heating/cooling capabilities of the vessel 110, other external or internal heat transfer devices for heating or cooling a process stream are also contemplated in various embodiments of the present invention (FIG. 4). Some suitable locations for one or such heat transfer devices are between pump 105 and HSD 140, between HSD 140 and vessel 110, and between vessel 110 and pump 105 when the system 1 is operated in a multi-pass mode. Some non-limiting examples of such heat transfer devices are shell, tube, plate, and coil heat exchangers, as known to those skilled in the relevant art.

Figure 7:
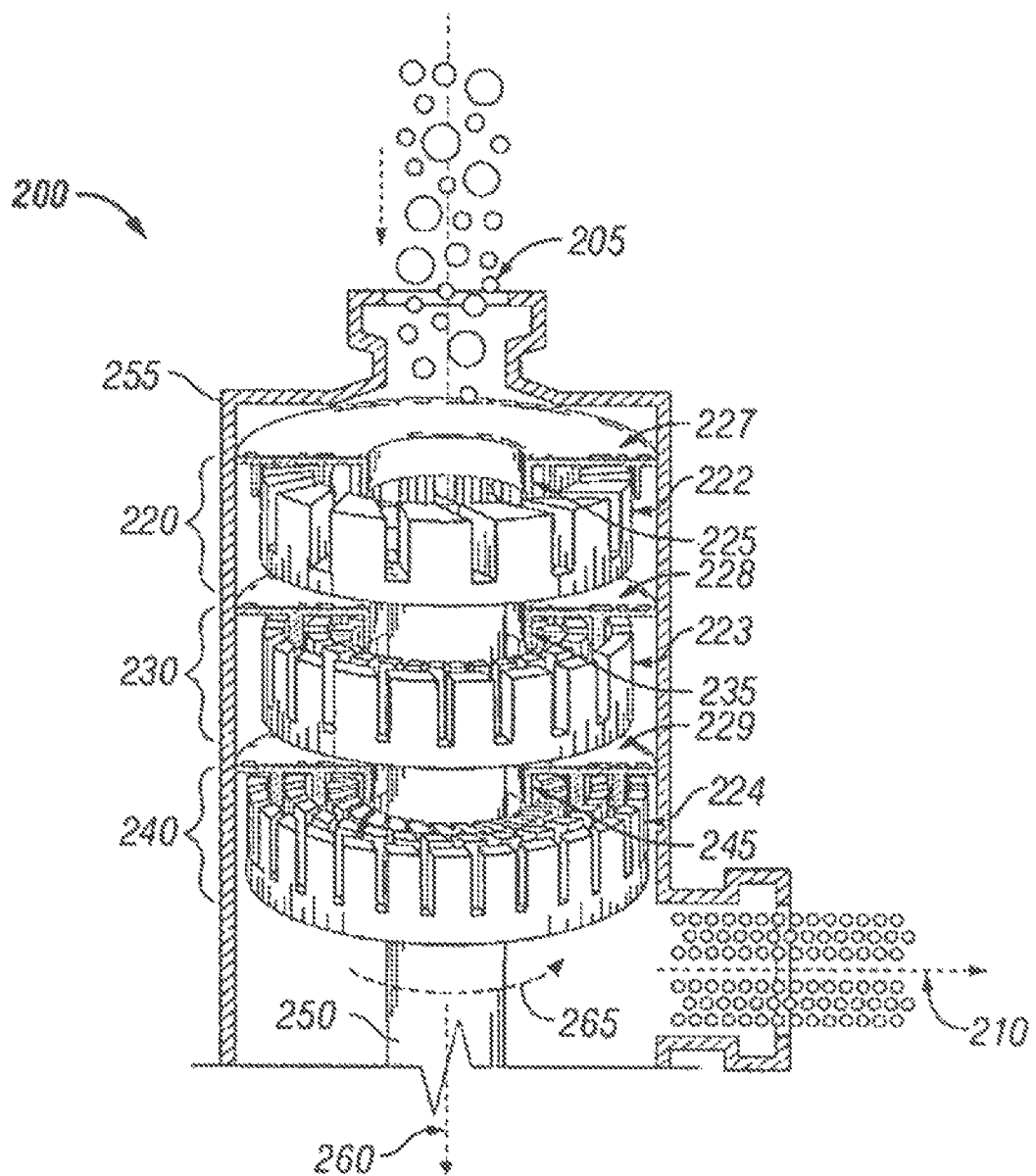
FIG. 7 is a longitudinal cross-sectional view of a multistage high shear device, as employed in an embodiment of the system of FIG. 6.

Referring now to FIG. 7, there is shown a more detailed view of the high shear device 140 of FIG. 6, now referred to in FIG. 7 as high shear device 200. In this cross-sectional view, high shear device 200 comprises at least one rotor-stator combination. The rotor-stator combination may also be known as generators 220, 230 or 240, or stages, without limitation. The high shear device 200 comprises at least two generators, and in some embodiments, comprises at least three generators.

The first generator 220 comprises rotor 222 and stator 227. The second generator 230 comprises rotor 223 and stator 228. The third generator 240 comprises rotor 224 and stator 229. For each generator 220, 230 240 the rotor is rotatably driven by input 250. The generators 220, 230, and 240 rotate about axis 260 in rotational direction 265. Stator 227 is fixedly coupled to the high shear device wall 255.

The generators include gaps between the rotor and the stator. The first generator 220 comprises a first gap 225; the second generator 230 comprises a second gap 235; the third generator 240 comprises a third gap 245. The gaps 225, 235 and 245 are between about 0.025 mm (0.01 in.) and 10.0 mm ((0.4 in.) wide. Alternatively, the process comprises utilization of a high shear device 200 wherein the gaps 225, 235 and 245 are between 0.5 mm (0.02 in) and about 2-5 mm (0.1 in). In certain instances the gap is maintained at about 1.5 mm (0.06 in). Alternatively, the gaps 225, 235 and 245 are different between generator 220, 230 and 240. In certain instances, the gap 225 for the first generator 220 is greater than the gap 235 for the second generator 230, which is greater than the gap 245 for the third generator 240.

Additionally, the width of the gaps 225, 235 and 245 may comprise a coarse, medium, fine and superfine characterization. Rotors 222, 223, and 224 and stators 227, 228 and 229 may be toothed designs. Each generator may comprise two or more sets of rotor-stator teeth, as known to those skilled in the art. Rotors 222, 223 and 224 may comprise a number of rotor teeth circumferentially spaced about the circumference of each rotor. Stators 227, 228 and 229 may comprise a number of stator teeth circumferentially spaced about the circumference of each stator. The rotor and stator may be of any suitable size. In one embodiment, the inner diameter of the rotor is about 64 mm and the outer diameter of the stator is about 60 mm. In other embodiments, the inner diameter of the rotor is about 11.8 cm and the outer diameter of the stator is about 15.4 cm. In further embodiments, the rotor and stator may have alternate diameters in order to alter the tip speed and shear pressures. In certain embodiments, each of the three stages is operated with a super-fine generator, comprising a gap of between 0.025 mm and about 3 mm. When a feed stream 205 including solid particles is to be sent through high shear device 200, the appropriate gap width is first selected for an appropriate reduction in particle size and increase in particle surface area. In embodiments, this is beneficial for increasing catalyst surface area by shearing and dispersing the particles.

High shear device 200 is fed a reaction mixture comprising the feed stream 205. Feed stream 205 comprises an emulsion of the dispersible phase and the continuous phase. Emulsion refers to a liquified mixture that contains two distinguishable substances (or phases) that will not readily mix and dissolve together. Most emulsions have a continuous phase (or matrix), which holds therein discontinuous droplets, bubbles, and/or particles of the other phase or substance. Emulsions may be highly viscous, such as slurries or pastes, or may be foams, with tiny gas bubbles suspended in a liquid. As used herein, the term "emulsion" encompasses continuous phases comprising gas bubbles, continuous phases comprising droplets of a fluid that is substantially insoluble in the continuous phase, or combinations thereof.

Feed stream 205 may include a particular solid catalyst component. Feed stream 205 is pumped through the generators 220, 230, and 240, such that product dispersion 210 is formed. In each generator, the rotors 222, 223, and 224 rotate at high speed relative to the fixed stators 227, 228, 229. The rotation of the rotors pumps fluid, such as the feed stream 205, between the outer surface of the rotor 222 and the inner surface of the stator 227 creating a localized high shear condition. The gaps 225, 235 and 245 generate high shear forces that process the feed stream 205. The high shear forces between the rotor and the stator functions to process the feed stream 205 to create the product dispersion 210. Each generator 220, 230, 240 of the high shear device 200 has interchangeable rotor-stator combinations for producing a narrow distribution of the desired bubble size, if feed stream 205 comprises a gas, or globule size, if feed stream 205 comprises a liquid, in the product dispersion.

The product dispersion 210 of gas particles, or bubbles, in a liquid comprises an emulsion. In embodiments, the product dispersion 210 may comprise a dispersion of a previously immiscible or insoluble gas, liquid, or solid into the continuous phase. The product dispersion 210 has an average gas particle, or bubble, size of less than about 1.5 µm. In embodiments, the bubble size is sub-micron in diameter. In certain instances, the average bubble size is less than about 400 nm (0.4 µm), and in certain instances, the average bubble size is less than about 100 nm (0.1 µm).

The high shear device produces a gas emulsion capable of remaining dispersed at atmospheric pressure for at least about 15 minutes. For the purposes of this specification, an emulsion of gas particles, or bubbles, in the dispersed phase in product dispersion 210 that are less than 1.5 µm in diameter may comprise a micro-foam. Not to be limited by any specific theory, it is known in emulsion chemistry that sub-micron particles, or bubbles, dispersed in a liquid undergo movement primarily though Brownian motion effects. The bubbles in the emulsion of product dispersion 210 created by the high shear device 200 may have greater mobility through boundary layers of solid catalyst particles, thereby facilitating and accelerating the catalytic reaction through enhanced transport of reactants.

The rotor is set to rotate at a speed commensurate with the diameter of the rotor and the desired tip speed as described hereinabove. Transport resistance is reduced by incorporation of high shear device 200 such that the velocity of the reaction is increased by about 5%. Alternatively, the high shear device 200 comprises a high shear colloid mill that serves as an accelerated rate reactor ("ARR"). The accelerated rate reactor comprises a single stage dispensing chamber. The accelerated rate reactor comprises a multiple stage inline dispenser comprising at least two stages.

Selection of the high shear device 200 is dependent on throughput requirements and desired particle or bubble size in the outlet dispersion 201. In certain instances, high shear device 200 comprises a Dispax Reactor® of IKA® Works Inc., Wilmington, N.C. and APV North America, Inc., Wilmington, Mass. For example, Model DR 2004/4 comprises a belt drive, 4M generator, PTFE sealing ring, inlet flange 1" sanitary clamp, outlet flange ¾" sanitary clamp, 2HP power, output speed of 7900 rpm, flow capacity (water) approximately 300 l/h to approximately 700 l/h (depending upon generator); a tip speed of from 9.4 m/s to about 41 m/s (about 1850 ft/min to about 8070 ft/min). Several alternative models are available having various inlet/outlet connections, horsepower, nominal tip speeds, output rpm, and nominal flow rate. In one embodiment, at least one rotor should be rotatable at a tip speed of at least 222.9 m/s (4,500 ft/min), wherein the tip speed is defined as $\pi Dn$, where D is the diameter of the rotor and n is the frequency of revolution.

Without wishing to be limited to a particular theory, it is believed that the level or degree of high shear is sufficient to increase rates of mass transfer and may also produce localized non-ideal conditions that enable reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressure and temperatures within the high shear device are instantaneous and localized and quickly revert back to bulk or average system conditions once exiting the high shear device. In some cases, the high shear device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming).

Multiple Pass Operation

In the embodiment shown in FIG. 5 the system is configured as a single pass process, in which the output from vessel 110 goes directly to further processing for recovery of the hydrogenated oil product. In some embodiments it may be desirable to pass the contents of vessel 110, or a liquid fraction containing unreacted oil, through HSD 140 during a second pass. In this instance, line 116 is connected to line 121 via dotted line 120, and the recycle stream from vessel 110 is pumped by pump 105 into line 113 and then into HSD 140. Additional hydrogen gas may be injected via line 122 into line 113, or it may be added directly into the high shear device (not shown).

The upgraded oils prepared by the hydrogenation process can be used in a variety of commercial applications, examples of which follow.

EXAMPLE 1

Effects of Hydrogenated Oils on Water Resistance of Cellulosic Products

Cellulosic products, such as paper, cardboard, linerboard, corrugated cardboard, oriented strand board, kraft paper and the like, are generally not water-resistant. Depending upon the ultimate use of the cellulosic product, they may be treated with one or more agents to make them water resistant. This is particularly true for paper products used for manufacturing cartons which will contain food items, such as fresh meat or vegetables, that are shipped in wet ice. Addition of a wax, such as a hydrogenated oil, can increase the water resistance of such products, and make the cartons easier to handle during shipping. Depending upon the construction of the paper product, such as whether it is corrugated or non-corrugated, and its ultimate use, one or more of a variety of different processes may be utilized to coat the paper product with a hydrogenated oil, wax, or comparable agent. The processes for coating the paper range from spray coating, immersion (or dip) coating, cascade coating, curtain coating, blade coating or roll coating. In general, the coating may comprise between about 2% by weight to about 3% by weight of the board. Conventional paperboard coated to provide a moderate moisture resistance typically has a wax coating weight of about 5-8 pounds/msf. However, other applications, such as boxes for shipping fish in wet ice, are coated using an immersion process, and generally have a higher wax content, about 40% by weight to about 55% by weight. In contrast, paperboard coated using a curtain coating process may have a wax content in the range of about 10% by weight to about 20% by weight. In several of the Examples which follow, the hydrogenated oils prepared according to the inventive method can be evaluated for their ability to enhance the water resistance of various types of cellulosic products.

EXAMPLE 1A

Effect on Linerboard

For the purpose of illustrating the invention, one inch by three inch strips of brown corrugated box board with no wax coating may be prepared. The hydrogenated oil may be dispensed into a beaker, and the temperature of the hydrogenated oil maintained at a temperature where the hydrogenated oil remained liquid, for example, 125 degrees C. The corrugated strips may then be dipped into the molten wax for a period of approximately two seconds. Samples may be prepared, and then dipped into the same wax for a second time and allowed to pick up additional wax. After cooling to let the wax solidify on the box board, these samples may be studied for their water resistance, and their ability to be recycled. To test for water resistance, the treated samples may be allowed to sit in room temperature water overnight, and the amount of water taken up by the sample then determined visually. To test for recyclability, the treated samples may be immersed in an alkaline water solution for a few hours, under conditions simulating conventional paper recycling methods, and the results observed visually.

EXAMPLE 1B

Effects of Hydrogenated Oils on Linerboard: Water Resistance and Recyclability

To further evaluate the hydrogenated oils they can be compared against a commercially available coating wax, such as one supplied by Citgo Petroleum, Lake Charles, La. (Citgo BLEND-KOTE® 467, Registered trademark of Citgo Petroleum Corp. Houston, Tex.)

Coating Procedure

Coatings may be made using a wet film applicator (Bird type) with a 1.5 to 5 mil gap depending on viscosity. The coating (the hydrogenated oil prepared in accordance with the present invention), the 4 inch wide applicator and sheets of ½ inch thick plate glass may be placed into a 200 to 250 degrees F. oven for 10-15 minutes, The glass may then be removed from the oven and strips of the linerboard (unbleached kraft paper, as known to those skilled in the art) may be placed onto the glass. A volume of the specific coating (hydrogenated oil) may be placed at one end of the linerboard, the applicator applied to the linerboard and the hot molten coating drawn by hand to coat the linerboard, which would then be allowed to solidify at ambient temperature.

Each sample may be tested to determine the coating weight, which can be expressed as either lbl/1000 square feet, or as a percent of the total weight of the coated product.

EXAMPLE 1C

Moisture Vapor Transmission Rate ("MVTR")

Moisture transmission is an important property of wax-based coatings. MVTR indicates how rapidly moisture would penetrate the coating and degrade the properties of the substrate. It is desirable to have a low MVTR in cartons containing produce, where excessive moisture would cause spoilage of the fruits or vegetables. Poultry is often shipped in freezer boxes, which are generally wax coated corrugated boxes (kraft paper coated with wax) that are packed with poultry (or other food item) and then rapidly chilled, often by immersion in a ice/water bath. If the paper were not protected from the water, the strength of the box would degrade, making the use of these kinds of boxes impractical. MVTR may be tested by a modified ASTM D3833 method. The modification requires the use of clamps to assure adhesion of the linerboard to the aluminum cup.

EXAMPLE 1D

Repulping Tests

To test the feasibility of repulping the wax coated samples, one and one half liter (1.51) of approximately 120 degrees F. hot tap water may be placed in the chamber of an Osterizer Blender (Model 6641). To the water may be added a quantity (3.98 grams) of Sodium Carbonate. The blender may be set on low speed and run for one minute to dissolve the sodium carbonate. The aqueous solution should have a pH of approximately 10. Then 5 grams of wax coated linerboard sample (prepared as described in Example 1A-1C above) may be added into the water. The blender may be run for ten minutes and then stopped briefly to look for sample pieces that had stuck to the sides of the lid. Any such pieces may be removed from the lid, and added back to the water in the blender. The blender may then be turned back on for an additional 10 minutes to complete the blending cycle. Immediately upon completion, 500 ml may be poured off and diluted with an additional 500 ml of hot water. The diluted solution may be poured into a quart jar. The samples are then subjectively compared to the Citgo Wax (control) sample, and scored on a scale of 0-3 based on the visual appearance, both the size and number, of the particles present.

A score of
0=No particles evident;
1=small number of small particles evident;
2=Moderate number of small particles evident (less than control wax); and
3=Very large number of small particles are evident.

EXAMPLE 2

Use of Upgraded Oils in Emulsion as a Fruit Coating

Wax emulsions are often used to reduce the moisture loss and help preserve produce such as citrus. Emulsions can be prepared using the hydrogenated oils prepared in embodiments of the present invention. Following the protocols in Example 9 of U.S. Pat. No. 7,267,743, assigned to the same assignee as the present specification, and incorporated by reference herein, aqueous emulsions could be prepared, and tested for their efficacy in reducing the moisture loss in fruits, such as citrus. An aqueous emulsion could be applied to fruit, for example, a lemon, by immersing the fruit in an emulsion for a specified time, and then allowing the coated fruit to dry. The fruits may then be weighed, placed in a cool dry room, and weighed periodically. The fruits may also be examined for signs of spoilage. The weight of the samples, compared to the initial weight, may be determined, and weight loss determined. In the example referred to above, the fruits had been used for a period of about 15 days.

To test the novel emulsion's effectiveness in reducing moisture loss in citrus an emulsion was prepared according to the following formulation and procedure:

A quantity of the upgraded hydrogenated oil (for example, 15 g) may be placed in a 400 ml Sorvall® (Norwalk, Conn.) stainless steel chamber and melted on an electric hot plate until clear. To the molten upgraded hydrogenated oil can be added a quantity (for example, 1 gm) of Polystep® F-5 nonylphenol ethoxylated (12 moles Ethylene Oxide) (Stepan Company Northfield, Ill.) and a quantity (for example, 1 gm) of a 30% KOH solution. The mix may be kept molten and agitated for 30 min. Separately, a quantity (for example, 50 gm) of tap water may be heated to boiling. The boiling water may be added to the hot molten wax mixture and immediately inserted into a Sorvall Omni-mixer homogenizer equipped with a Sorvall model 17183 rotor-knife agitators. The mixer speed may be set to 0.5. After 1 min 30 sec. the chamber may be placed in cold tap water and allowed to cool while still under agitation. Following cooling to ambient temperature the appearance of the resulting emulsion may be evaluated.

Lemons may be purchased from a local vendor. A quantity of the emulsion (for example, 23 grams) may be added to 230 grams of tap water and mixed until uniform, to form a coating composition. A quantity (for example, 3) of the lemons may be immersed in the coating for 30 seconds and then removed, and may be placed atop 50 ml beakers and allowed to dry. After 8 hours three uncoated lemons, designated as Untreated Control Lemons and the three-coated lemons, designated as Treated Lemons, may be weighed and this weight may be designated as the initial weight (WI) for the experiment.

The lemons may be placed in a cool dry room and weighed periodically, and the average results for the three Untreated Control and three Treated Lemons determined as a function of time, and also may be examined for signs of spoilage. In certain experiments, the lemons may be evaluated for a period ranging from about 10 days to about 25 days, although shorter time periods are anticipated.

EXAMPLE 3

Use of Upgraded Oils in Preparation of Hot Melt Adhesives

Examples 1-3E of U.S. Pat. No. 6,896,982 B2, assigned to the same assignee as the present specification, and incorporated by reference herein, describe the use of hydrogenated waxes in the preparation of hot melt adhesives, prepared with a tackifier and an ethylene vinyl acetate resin, using the upgraded oil in place of waxes derived from petroleum products. Following the protocols of these examples, preparations of hot melt adhesives may be formulated using the upgraded oils of the present invention, and the efficacy of the resulting adhesive tested. In these examples, parameters such as melting point, open time, viscosity, shear adhesion failure temperature, and peel adhesion failure temperature, as exemplary properties, may be tested.

EXAMPLE 4

Preparation and Evaluation of Adhesive Formulations

For the purpose of illustrating the invention, evaluations may be conducted to determine the performance of the upgraded oil versus a 'control' petroleum derived microcrystalline wax in standard hot melt EVA (ethylene vinyl acetate) formulations.

The following materials may be used to make the EVA adhesive formulations
1. EVA resin with 18% VA content, ULTRATHENE® 612-04 made by Equistar Chemical, LP
2. EVA resin with 28% VA content, ULTRATHENE® 646-04 made by Equistar Chemicals, LP.
3. Rosin Ester tackifier, FORAL® 85 made by Hercules.
4. Microcrystalline Control Wax, 1251/7 supplied by Frank B. Ross Co.
5. Thermal stabilizer IRGANOX® 1010 made by Ciba-Geigy.

The compositions of the formulations are in Table 4; the ingredients may be added on a weight basis, and may be designated as either "High VA" (indicating the use of the 28% EVA content resin), or "Low VA" (indicating the use of the 18% EVA content resin). Ingredients may be blended in a quart can heated by a glass-heating mantle. Tackifier resin and Anti-oxidant may then be added into the can and allowed to heat for 10 minutes. Mixing may be started at a moderate rate of speed while the EVA may be slowly added over 25 minutes. While mixing continues the upgraded oil may be slowly added over a 15-minute period into the adhesive. The adhesive may be allowed to mix an additional 15 minutes to assure uniformity. The final adhesive temperature should be in the range of about 350 degrees F. to about 360 degrees F.

EXAMPLE 5

Compatibility Testing of Upgraded Oil with Adhesive Formulation Components

To determine whether the upgraded hydrogenated oil is compatible with the other components of the hot melt adhesive formulations, a quantity (for example, 25 grams) of adhesive may be placed into a 4-ounce glass jar. The jar may be placed in an oven at 350 degrees F. and the adhesive examined visually every half hour for 2 hours for evidence of phasing or incompatibility. If the results show that after 2 hours at 350 degrees F., the adhesive formulations are crystal clear and uniform in appearance, that data would indicate that the upgraded hydrogenated oil is compatible with the other components of the adhesive formulations, in formulations having high and low VA content.

EXAMPLE 6

Adhesive Properties of the Inventive Formulations

To evaluate the adhesive properties of the inventive formulations, the hot melt formulations may be coated onto 56# basis weight paper typically used in the manufacture of cardboard boxes. The formulations may be coated at both 5 and 10 mil thickness.

Coatings may be made using a wet film applicator (Bird type) with a 5 or 10 mil gap. The adhesive composition, the 4 inch wide applicator and sheets of ½ inch thick plate glass may be placed into an oven for equilibration. After the appropriate time interval, the glass may be removed from the oven and strips of the 56# basis weight paper, may then be placed onto the glass. A volume of the specific coating may be placed at one end of the paper, the applicator applied to the paper and the hot molten adhesive drawn by hand to coat the paper.

Equivalent coating weights may then be calculated.

EXAMPLE 6A

Open Time

Open time evaluations may be conducted on the adhesive formulations according to the ASTM D-4497 test procedure. For this evaluation, a 10 mil thick layer of each formulation may be coated onto 56# basis weight paper, and 1×4 inch strips of standard kraft paper (1810A) may be laid onto the warm adhesive at timed intervals ranging from 0, 5, 10, 15, 20 and 25 seconds. Following complete cooling, the strips may be removed, and the removed strips evaluated for the degree of paper tearing. If greater than 50% paper tear is evident, the hot melt adhesive may be considered 'open'.

The open time for adhesives containing the upgraded hydrogenated oils of the present invention may be compared to the open time for the control. If the open time is longer than that of the control, it may be advantageous for applications where there needs to be some time allowed before the articles are bonded. In other applications a change in the formulation (i.e. more of the upgraded oil or the addition of a small quantity of higher melting upgraded oil) can result in matching the open time of the control formulation.

EXAMPLE 6B

Viscosity

The adhesive formulations may be evaluated for viscosity by using a Brookfield Viscosity measurement device according to ASTM test method D3236 Formulations may be analyzed using a Brookfield LVDV II+ viscometer, HT-2 Sample Chamber and a number 27 spindle with a rotation speed of 20 rotations per minute. A sample chamber may be filled with a quantity (for example, 10.5 grams) of each formulation and then placed into the Thermosel that may be preheated to 300 degrees F. and allowed to stabilize for 10 minutes. After the sample chamber had come to temperature the spindle may be inserted. When the spindle is in place, the sample may be given 30 minutes to equilibrate, and the first viscosity may be measured at 300 degrees F. The temperature may then be increased to 350 degrees F. and the final viscosities recorded after 30 minutes at 350 degrees F. The results are then compared to the viscosity of the control preparation, and examined for whether the data are within acceptable limits for hot melt adhesives.

EXAMPLE 6C

Peeling Test

The T-peel test is a standard test method for measuring adhesive performance, and is known to those skilled in the art. Briefly, the extent of paper tearing is a measure of adhesion; the greater the force needed to achieve a tear, the stronger the bond. To evaluate the adhesive properties of the present invention, a standard T-Peal test method (ASTM D-1876) may be utilized. T-peel testing may be performed on a Chem-Instruments TT-1000 Tensile Tester. Paper tear indicates good bonding and the actual value is a function of the strength of the adhesive bond.

EXAMPLE 6D

Shear Adhesion Failure Temperature Test

The Shear Adhesion Failure Temperature ("SAFT") test is another commonly used test to evaluate adhesive performance, and well known to those skilled in the art. The SAFT test measures the temperature at which an adhesive fails. The formulations of the present invention may be evaluated using a standard SAFT test method (ASTM D-4498). SAFT tests may be run using a ChemInstruments HT-8 Oven Shear Tester. The tests may be started at room temperature (25° C./77° F.) and the temperature increased at the rate of 0.5 degrees C./min. The results are converted and reported in degrees F., and compared to the control formulation.

EXAMPLE 6E

Adhesive Parameter: Melting Point

To measure the melting points of the adhesive formulations of the present invention a technique called Differential Scanning calorimetry ("DSC") may be utilized, a method commonly used to determine the melting point of various substances. DSC measures the heat flow into a substance as a function of sample temperature. An exothermic transition is noted by absorption of energy while an endothermic transition is when a substance gives off energy. A few milligrams of sample may be placed into the instrument and the temperature is then increased from 0 degrees C. to a desired temperature at the rate of 10 degrees C./min. The thermogram results are plotted as watts/gram (energy) versus temperature. An exothermic (i.e. melting or sublimation) transition will show as a positive peak.

EXAMPLE 7

Use of Upgraded Oils in Emulsion to Render Gypsum Water Resistant

Examples 1-2 of U.S. patent application Ser. No. 10/682,283, assigned to the same assignee as the present specification, and incorporated by reference herein, describe the use of hydrogenated waxes to render gypsum resistant to water. Following the protocols of these examples, cores of gypsum may be prepared, and treated either with an emulsion containing a quantity of the upgraded hydrogenated oil of the present invention, or a sample of the upgraded hydrogenated oil added directly into a gypsum preparation as it is being formulated. The treated samples, as well as control, untreated preparations, may be treated with water as described, and then tested for their ability to resist the uptake of water.

A. Effect of Water Based Emulsion of Triglyceride Wax on the Water Resistance of Gypsum.

For the purpose of illustrating the invention, standard grade gypsum samples (non water resistant) may be taken from an 8 ft by 4 ft standard ½ in. thick gypsum board purchased at a commercial building supply store. The manufacturer of the board may be United States Gypsum Corp, Chicago, Ill. Samples may be prepared by cutting 6 in. by 6 in. squares of gypsum from the center portion of the board and scraping the paper off each side of the board. Additionally, approximately 1/16 in. of gypsum directly adjacent to the paper facing may be scraped off. The resulting gypsum may be pulverized with a mallet and screened through a 12-mesh screen. The gypsum powder may be placed in an open metal container and placed in a preheated oven at 530 degrees F. for a period of one hour, to produce a resulting anhydride gypsum to be labeled 'calcium sulfate hemihydrate' and used to prepare samples for evaluation.

An emulsion may be prepared according to the following formulation and procedure:

A quantity (for example, fifteen grams ((15 gm)) of the upgraded hydrogenated oil of the present invention may be placed in a 400 ml Sorvall® (Norwalk, Conn.) stainless steel chamber and melted on an electric hot plate until clear. To the molten upgraded hydrogenated oil may be added a quantity (for example, 1 gm) of Polystep™ F-5 nonylphenol ethoxylated (12 moles Ethylene Oxide) (Stepan Company Northfield, Ill.) and a quantity (for example, 1 gm) of a 30% KOH solution. The mix may be kept molten and agitated for 30 min. Separately, a quantity (for example, 50 gm) of tap water may be heated to boiling. The boiling water my then be added to the hot molten wax mixture and immediately inserted into a Sorvall® Omni-mixer homogenizer equipped with a Sorvall® model 17183 rotor-knife agitators. The mixer speed may be set to 0.5. After 1 min 30 sec. the chamber may be placed in cold tap water and allowed to cool while still under agitation. Following cooling to ambient temperature, the appearance of the resulting emulsion may be evaluated.

Several samples of gypsum may be prepared using the above ingredients according to the following formulations:

TABLE 1

| Gypsum formulations | | | |
|---|---|---|---|
| Sample No. | Calcium Sulfate Hemihydrate | Water | Emulsion #4 |
| 1 | 7.2 gm | 9.8 gm | 0.5 gm |
| 2 | 7.2 gm | 9.8 gm | 1.0 gm |
| 3 | 7.2 gm | 9.8 gm | 1.5 gm |
| 4 | 7.2 gm | 9.8 gm | 2.0 gm |
| 5 | 7.2 gm | 9.8 gm | 2.5 gm |
| 6 | 7.2 gm | 9.8 gm | 0 gm |

Each sample may be well mixed manually with a glass rod until consistent. Sample material may be placed into plastic cylinders (polyinylchloride, "PVC") with a nominal 1½ in. inner diameter and ½ in. height. The cylinders may be placed atop a ¼ in. glass plate, and excess sample may be discarded. The cylinders and glass plate may be placed in an electric oven, preheated to 257 degrees F., for one hour to allow for drying. Samples may then be removed from the oven an allowed to cool to room temperature.

The water resistance of the samples may be evaluated by filling a glass tube with a nominal 1/16 in internal diameter with water up to a mark of 1 in. This column of water may then be placed on the sample surface (the samples being supported by a glass plate) and the time required to absorb the water may be measured, and the rate of water absorption determined.

EXAMPLE 8

Effect of Powdered Vegetable Wax on Moisture Resistance of Gypsum

A sample of the upgraded hydrogenated oil of the present invention may be placed into a 400 ml Sorvall® (Norwalk, Conn.) stainless steel chamber and ground The ground wax may be screened through a 75-mesh screen.

A sample of powdered paraffin wax (supplied by Moore and Munger Corp.) with a melting point of 139 degrees F. may be prepared using a razor and shaving thin films off the blocks of wax. The shavings may be frozen and then pulverized to flakes averaging 1-3 mm in diameter.

Calcined gypsum may be weighed in a 50 ml glass flask and dry mixed with the indicated quantities of dry wax (see Table 2). Water may then be added and mixed with a glass rod until a consistent smooth mix is obtained. The mixture may be placed in round PVC cylinders with an inner diameter of 1½ in. and ½ in. height that had been placed atop a glass plate. The PVC cylinders may be sprayed with a light coat of silicone release (Nappa) prior to placing the gypsum slurry into them.

The samples may then be placed in an electrically heated temperature controlled lab oven for 1 hr at 200 degrees F. to dry.

To test water absorption of the samples, the dry gypsum cylinders may be removed from the PVC containers and weighed; the weighed gypsum samples may be immersed in 2 in. of room temperature tap water for 2 min. Immersion may include placing the samples on a screen and placement into a water bath at room temperature. Samples may be removed from the water bath, the samples may be blotted using a paper towel to remove excess surface water and then reweighed; the amount of water absorbed may be calculated as a percent of the original weight.

The table below (Table 2) indicates the sample formulations that may be utilized.

| Sample No | Calcined Gypsum | Upgraded Hydrogenated Oil | Powdered 139F Paraffin Wax | Water Added to Powder |
|---|---|---|---|---|
| #1 | 15 gm | 0 | 0 | 10 gm |
| #2 | 15 gm | 0.3 gm | 0 | 10 gm |
| #3 | 15 gm | 0.6 gm | 0 | 10 gm |
| #4 | 15 gm | 0.9 gm | 0 | 10 gm |
| #5 | 15 gm | 0 | 0.6 gm | 10 gm |
| #6 | 15 gm | 0 | 0.9 gm | 10 gm |
| #7 | 15 gm | 1.5 gm | 0 | 10 gm |
| #8 | 15 gm | 1.5 gm | 0 | 7.5 gm |
| #9 | 15 gm | 0 | 1.5 gm | 7.5 gm |

The results may be evaluated and the water absorption rates for the upgraded hydrogenated oil may be compared to that of paraffin wax Commercially produced water resistant gypsum board is known to have typical paraffin wax addition rates of 3-5% based on the weight of the gypsum.

EXAMPLE 9

Use of Upgraded Oils to Reduce Mar and Abrasion in Inks and Coatings

Examples 2-3 of U.S. patent application Ser. No. 10/973,606, assigned to the same assignee as the present specification, and incorporated by reference herein, describe the use of hydrogenated waxes when used in printing inks to reduce mar and abrasion that occur when the inks are applied to various surfaces. Following the protocols of these examples, ink formulations, such as an aqueous, flexographic ink (for example, Shamrock S-368 NST) (Shamrock Technologies, Inc., Newark N.J.) could be prepared, using a quantity of the upgraded oil produced in the present invention. The ink would then be applied to a cellulosic substrate, and the dried ink tested for properties such as slip, gloss, or rub resistance.

In an embodiment of the composition of the present invention, the ink or coating formulation used is water based due to the functionality and compatibility of the hydrogenated vegetable oil with other components of water based ink and coating formulas. Embodiments of the present invention would be particularly well suited for water based flexographic inks which are widely used in industry. Embodiments of the present invention could be used in other types of printing inks, provided that the hydrogenated vegetable oil is compatible with the other components of the formulation, and that there is no degradation of the hydrogenated vegetable oil in such formulations. One example of an ink formulation comprises between 20%-60% (weight percent) of an acrylic resin dispersion, between 5%-30% (weight percent) of a pigment, between 0.5%-10% (weight percent) of an alcohol, between 0.01%-5% (weight percent) of a defoaming agent, between 20%-75% (weight percent) of an aqueous solvent, and between 0.5%-5% (weight percent) of a hydrogenated, vegetable oil.

EXAMPLE 9A

Ink Formulations

To test the effectiveness of the wax composition of the present invention, ink formulations of a water-based flexographic ink may be prepared including a commercially used wax (Shamrock S-368 N5T), the inventive hydrogenated vegetable oil and a control preparation containing no wax additives. Starting with a master batch of a water-based commercial black ink known to contain no wax, a small quantity (100 gm) of water-based test inks (100 gr.) may be made. The composition of the black ink, a commercially used ink formulation, sold by Weber and Permut, Inc. (Linden, N.J.) is summarized below (Table 3).

TABLE 3

| Composition of Black Ink (Wax-free Master Batch) | |
|---|---|
| 48% | Acrylic Resin Dispersion (RHOPLEX ®, Rohm and Haas, Philadelphia, PA) |
| 14% | Carbon Black |
| 1.0% | Isopropyl Alcohol |
| 0.5% | Defoamer (SURFYNOL ® MD-20, Air Products Corp. Allentown, PA) |
| 37% | Water |

A black ink was chosen because black inks are known to easily show differences in gloss, and rub resistance tests are generally easy to read. The pH of this ink is approximately 8.2 to approximately 8.6.

EXAMPLE 10

Evaluations of the Ink Formulations

The test ink formulations prepared in Example 9 were tested for properties such as slip, gloss, and rub resistance.

Slip is a measurement of the resistance to movement between two objects, and is generally measured by placing two objects, one of top of the other on another surface, and raising the surface, as an inclined plane, until one object slips over the other object.

Gloss is a function of the ink's ingredients, the substrate, and the smoothness of the surface of the ink film. To test for gloss, a known amount of light is angled onto the ink surface, and picked up after reflection from the ink surface. The percent of light picked up is directly related to what an observer sees as gloss.

Rub is used to measure the resistance of the printed sample to marring from the repeated rubbing of its surface. The tester generally rubs a sample of an abrasive, or a sample of the unprinted stock, against a sample of the printed stock for a certain number of cycles and at a specified pressure. The results are judged by a visual observation of the sample.

For each of these tests, a series of drawdowns of the three test ink formulations may be made on Form 3NT-3 Coated Book Leneta Test Sheets using a #6 Meyer rod. The drawdowns may be oven dried for 30 seconds at 140° F., and then allowed to stand at room temperature for 24 hours before testing.

EXAMPLE 10A

Property:SLIP

Hand rub tests may be made on both sets of prints to get a feel for the slip properties of the formulations. Standard rub tests may also be also run on a Sutherland Rub Tester at room temperature. The tests may be made using a 4 lb. weight and 50 cycles, after which the prints are evaluated for their appearance, and the prints photographed. The results may be determined by visual inspection of the rubs.

EXAMPLE 10B

Property:GLOSS

Gloss readings may be taken on the dried prints using a Gardner Gloss Meter with the 60° aperture. Three readings may be taken on a print, and the results averaged.

EXAMPLE 10C

Property:RUB

Sutherland Rub Tests may also be performed using these ink formulations, and observations may be made upon a visual examination of the test samples.

EXAMPLE 11

Use of Upgraded Oils for the Production of Fire Logs

The upgraded oils of the present invention could also be used in compositions employed as artificial fire logs, such as those used in a fireplace within a residence, a business or other location. Trees have generally been cut for firewood, but among problems associated with the use of wood is that the wood often requires seasoning prior to use, heat output is not uniform, and there is a dwindling supply of trees. Numerous types of artificial fire logs have been developed for use instead of firewood, and these fire logs are manufactured with a combustible material which is contained in a combustible wrapper, such as paper.

Examples of the combustible materials which have been utilized for fire logs include, but are not limited to, cardboard, coffee grounds, coffee bean waste, grass clippings, newsprint, nut shells, recycled paper, repulped paper, sawdust, shredded paper, tree bark, tree branches, wood chips and wood shavings, which can be compressed into a block or core, or contained within the wrapper. In addition to the combustible material, the fire log composition may have an oil or a wax added, which may serve as a secondary fuel source, and may affect some of the properties of the fire log.

The combustible material may include any flammable substance. For example, a combustible material could be any material of a cellulosic origin, such as wood or vegetable fibers. In an embodiment, the combustible material could be sawdust. Sawdust can include any roughly or finely ground wood-based particulate matter. Wood flour is a term used to describe sawdust that is finely ground. Examples of combustible materials include particulates having sizes ranging from about 0.15 mm to about 5 mm. Embodiments could comprise combustible materials comprising pine sawdust and flour, but other embodiments could utilize sawdust from one or more hard woods and/or softwoods.

In embodiments, the combustible material is dried before being added to the fire log mixture or composition. Generally, recently produced sawdust is obtained from "green" lumber, that is, lumber which has not been dried and therefore may contain a high moisture content. Sawdust that contains a high moisture content can be dried in an oven, commercial dryer or other heated environment, as known to those skilled in the art, for a time period sufficient to remove the bulk of the moisture. Drying the sawdust improves its combustion value by increasing the average heat producing value and also improves the sawdust's ability to absorb the blend of liquid components, that is, the oil and wax components, of the fire log composition. This in turn can result in a mechanically stronger manufactured fire log having improved burn characteristics.

Other embodiments could include combustible materials that are a mixture of one or more different types of sawdust and/or wood flour, such as, a mixture of sawdust and wood flour.

In embodiments, a fire log composition comprises about 50% by weight combustible material. Compositions of embodiments could comprise from about 35% to about 65% by weight combustible materials of the total fire log composition. Other embodiments could comprise a log with different ranges of combustible material. For example, one log embodiment could comprise from about 35% to about 40% by weight combustible material of the total combustible weight. Another log embodiment could comprise from about 40% to about 45% by weight combustible material of the total combustible weight. Another log embodiment could comprise from about 45% to about 50% by weight combustible material of the total combustible weight. Other log embodiments could comprise from about 50% to about 65% by weight combustible material of the total combustible weight.

Embodiments of the fire log could include log compositions that comprise a combustible material with a blend comprising an oil and a wax-based material or a polymer. The oil may be any combustible extract from a plant.

Embodiments of the fire log may comprise one or more waxes. The wax may be any low or high melting organic mixture or compound of high molecular weight. The wax may be derived from natural or synthetic sources. Natural sources may comprise waxes from animals, insects, vegetables, mineral or petroleum sources. Synthetic sources may, for example, comprise waxes produced from processed petrochemicals. The wax may comprise any isotactic, syndiotactic or atactic structure, or blends thereof. Depending upon the oil utilized and the extent of its hydrogenation, the oil could also be a wax.

In embodiments, the wax component of the fire log may comprise a polyethylene wax. The polyethylene wax may comprise, for example, a high density polyethylene wax, a low density polyethylene wax, and/or mixtures thereof. In an embodiment, a modified wax, such an oxidized polyethylene wax, could be utilized.

Other embodiments of the fire log composition may comprise an ester or an olefin-based wax. In embodiments, the wax component may comprise an alpha-olefin wax and a polyethylene wax. In other embodiments, the ratio of oil, for example, plant oil to wax, e.g., an alpha-olefin wax to polyethylene wax is about 90:9.5:0.5. In an embodiment, the ratio of oil, e.g., plant oil to wax, e.g., an alpha-olefin wax, to polyethylene or polypropylene wax is about 80:10:10. In another embodiment, the fire log may comprise at least two or more waxes.

In embodiments, the plant oil may comprise up to 80% by weight of the oil and wax blend by weight. Other embodiments may comprise mixtures of wax and modified plant oil ranging from about 30% to about 70% by weight of the log by weight.

In embodiments, the wax is mixed with the upgraded oil in various ratios. In one embodiment, the ratio of oil to wax may be about 19:1. In another embodiment, the ratio of oil to wax may be about 4:1. In another embodiment, the ratio of nil to wax may be about 1:1, although other ratios may be utilized, depending upon the other components being used in the fire log composition.

The wax and upgraded oil, in embodiments, may be combined to form a molten liquid blend. In an embodiment, the upgraded oil may comprise up to about 95% of the total blend by weight. In other embodiments, the upgraded oil may comprise up to about 80% of the blend by weight. In another embodiment, the upgraded oil may comprise up to about 65% of the blend by weight. The quantity of the upgraded oil may be varied, depending upon the other components used to manufacture the fire log in different embodiments.

In an embodiment, the fire log composition may comprise up to 80% upgraded oil by weight of the blend. Other embodiments could include blends comprising the upgraded oil by weight in the range of from about 55% to about 90%.

Another type of fire log could be prepared using the procedures described in U.S. Pat. App. Pub. No. 2005/0016062 A1 ("the '062 application"), the contents of which are incorporated by reference herein.

A fire log contains a core fuel block that is over-saturated with an oil, which can be in the range of about 65% by weight to about 75% by weight.

In an embodiment, the oil utilized can be the upgraded oil of the present invention. The core (fuel block) comprises an organic fibrous substrate, which may represent from about 20% by weight of the fire log to about 30% by weight of the fire log, and which core consists of compressed paper-based products such as cardboard, newsprint and other recyclable paper. The core is surrounded by a vegetable wax envelope that represents from about 1% of the total weight of the log to about 6% of the total weight of the log.

The core may comprise recyclable paper. The recyclable paper can be prepared by first allowing paper, for example, newsprint or the like, to partially decompose, such as by exposure to sunlight and water, then reacted with additional water in a recycling and/or repulping process, as known to those skilled in the art, to form a homogenous slurry. Much of the water is removed from the slurry such that the aqueous mass can be formed into a solid fuel block by means of compression of the mixture in a perforated cylinder, and removal of water through the perforations After formation, the fuel block is dried, and while still warm is immersed in a warm vegetable oil, such as the upgraded oil of the present invention causing the oil to be absorbed onto the fuel block, and allowed to dry. The dried and oil saturated fuel block is then wrapped with a wax-coated paper, which may contain materials that are either combustible and/or biodegradable. The oil in the wrapper can also serve as an additional source of fuel for the fire log. After wrapping, the fire logs are packaged and stored prior to use.

The fire logs may be made to a variety of sizes. For example, sample logs could be made to have a length of about 8 inches with a diameter of about 3 inches, larger size fire logs, for example only, 18 inches in length and 4 inches in diameter, could be prepared by scaling up the manufacturing process.

One or more essential oils may be added to the fire log composition to provide a particular scent to be emitted when the fire log is burned.

Using the upgraded oils prepared as described in the present invention, fire logs can be prepared by substituting the upgraded oil for the waxes and/or oils used in the preparation of the fire log.

EXAMPLE 11A

Fire Log Composition

A 5 pound fire log may be made from about 48% wood flour and about 52% molten liquid blend. The liquid blend may be composed of about 80% upgraded oil prepared using methods of the present invention, and about 20% of a wax. In an embodiment, the wax may be a polyethylene wax. In other embodiments, the wax may be a Fischer-Tropsch wax, a paraffin wax, a microcrystalline wax, or a wax obtained from one of the animal or vegetable sources described in detail elsewhere in this specification. The properties of the liquid blend, such as viscosity, melting point, melt index using Differential Scanning calorimetry, and other properties may be determined using standard methods known to those skilled in the art. The log may be wrapped in a paper wrapper, or in a paper wrapper saturated with the upgraded oil.

EXAMPLE 11B

A Second Fire Log Composition

A 6 pound fire log may be produced by extrusion of water from the core contained in a perforated vessel, and may contain from about 44% wood flour and about 56% molten liquid blend. The liquid blend may be composed of about 75% upgraded oil prepared using methods of the present invention, and about 25% of a wax. In an embodiment, the wax may be a polyethylene wax. In other embodiments, the wax may be a Fischer-Tropsch wax, a paraffin wax, a microcrystalline wax, or a wax obtained from one of the animal or vegetable sources described in detail elsewhere in this specification. The properties of the liquid blend, such as viscosity, melting point, melt index using Differential Scanning calorimetry, and other properties may be determined using standard methods known to those skilled in the art. The log may be wrapped in a paper wrapper, or in a paper wrapper saturated with the upgraded oil.

EXAMPLE 12

Drilling Muds

A drilling fluid, commonly referred to as a drilling mud, is used in the petroleum industry when drilling wells for either oil or natural gas. The basic function of a drilling mud is to lubricate the drill bit and remove cuttings. The drilling mud is piped from a storage tank through the bore hole of the well, where it exits through the drill, and returns through the area between the drilling pipes and the wall of the well to the surface where debris is removed, additives are added to regenerate the mud to specific properties, such as a specific viscosity, and the mud is reused.

Other functions of the drilling mud include transporting the drilling cuttings to the surface, balancing pressures to prevent a blowout of the well, preventing influx of formation fluids into the wellbore, cooling, lubricating and supporting part of the drill and drill pipe, and sealing of exposed permeable formations Generally, the geological formation in which the well is being drilled will determine the type of drilling mud to be used. The American Petroleum Institute ("API") sets the standards for drilling muds.

Clays and/or salts, such as sodium chloride, are among the agents used to increase the viscosity of drilling muds. Other useful agents include polysaccharides such as starch, guar gum or xanthan gum; biopolymers such as cellulose or lignite; or synthetic polymers such as polymers or copolymers of acrylic acid or acrylamide. Modified celluloses, such as carboxymethylcellulose or hydroxyethylcellulose may also be utilized. Various pyrophosphates may be used as thinning agents to reduce viscosity. Surfactants and/or emulsifying agents are also incorporated into drilling muds, which may also contain one or more foaming agents, or defoaming agents, depending upon the location.

Another function of the drilling mud is to maintain the pressure in a circulating system. Drilling in permeable or cavernous formations or fractured zones may lead to a loss of fluid into the environment, and consequently a loss of pressure. A number of agents have been developed as fluid loss agents to assist in maintaining pressure. Some examples of these agents include shredded cellophane and paper, rice hulls, laminated plastic, sawdust, straw, leather, ground rubber, nylon, plastics, limestone and ground nut shells. Other agents, such as sodium or potassium silicates, have also been used as fluid loss agents.

The majority of drilling muds are aqueous, and include one or more clays or polymers which function as viscosity builders, various rheology control agents and other additives. Other drilling muds are oil-based (See S. D. Ukeles and B. Grinbaum, Drilling Fluids, pp. 1-42 in volume 9, Kirk-Othmer Encyclopedia of Chemical Technology, $5^{th}$ edition, 2005, John Wiley & Sons, Hoboken, N.J.)

Hoskins (U.S. Pat. No. 7,705,09 B2) discloses an oil-based drilling fluid in which a wax or a waxy substance, primarily petroleum-based or synthetic waxes are used as the primary seepage loss agent. Among the potential secondary seepage loss agents that could be utilized include organic fibers, sawdusts, GILSONITE® (Registered trademark of American Gilsonite Co., Menlo Park, Calif.), asphalt, cellophane, plastics, calcium carbonate, sulfonated asphalt, sulfonated GILSONITE® or combinations thereof. Among the desired properties of a seepage loss agent are that it have minimal effects on both the drilling mud and the drilling equipment, and minimal interference with solids control or directional drilling equipment. The waxes employed are used at a concentration ranging from about 0.01 kilograms per cubic meter to about 500 kilograms per cubic meter of drilling fluid.

Hayatdavoudi et al. (U.S. Pat. No. 6,105,691) disclose a modular aqueous drilling mud formulation that contains caustic, a natural wax, a natural thinner, phosphoric acid and/or boric acid, and optionally a gel, such as acrylamide. The drilling fluid adjusts the properties of conventional drilling muds including increasing lubrication, thins the drilling mud, decreases bit balling, decreases rock resistance and controls phase separation of the drilling muds. The natural waxes used in the composition facilitate the formation of emulsions and assist in coating solid particles released by drilling. Examples of waxes that can be used include montan wax, carnauba wax, palm wax and waxes from cotton, linters, and lignite deposits.

In embodiments, the hydrogenated oil produced in accordance with the processes of the present invention may be added to a drilling mud in a quantity sufficient to prevent loss of fluid from the drilling mud. The drilling mud used may be an aqueous or an oil-based drilling mud, and selected from one or more of the drilling mud compositions known to those skilled in the art.

EXAMPLE 13

Asphalt

Embodiments of the hydrogenated oil of the present invention may also be incorporated into asphalt to act as a modifier. Asphalt is a material that is commonly used for construction, such as in asphalt shingles and in road construction.

Generally, asphalt is often obtained as the residue from vacuum distillation of petrochemicals, from a hydrocarbon cracking residue, or as naturally occurring asphalt. The ASTM defines asphalt as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons.

Bitumen is a generic term defined by the ASTM as a class of black or dark-colored cementitious substances, natural or manufactured, composed principally of high molecular weight hydrocarbons, of which asphalts, tars, pitches and asphaltenes are typical. The ASTM further classifies asphalts or bituminous materials as solids, semi-solids, or liquids using a penetration test for consistency or viscosity.

Aggregate is a collective term for the mineral materials, such as sand, gravel, and crushed stone that are used with an asphalt binder to form compound materials such as an asphalt paving composition. The type of aggregate and the amounts used vary depending on the use of the hot mix asphalt composition. Generally, the aggregate accounts for at least 90% by volume of an asphalt composition, with some asphalt compositions containing between 92% to 96% aggregate by volume.

A hot mix asphalt composition is one requiring that the asphalt and aggregate be mixed at a temperature of at least 300 degrees F., and being used for paving at a temperature of about 265 degrees F. to about 320 degrees F.

A warm mix asphalt composition is one requiring that the asphalt and aggregate be mixed at a temperature of about 250 degrees F. to about 275 degrees F., and can be used for paving at a lower temperature than can hot mix asphalt; the processes used for making warm mix asphalt differ from those of hot mix asphalt.

Asphalt has viscous properties, which allow it to flow, and elastic properties, which resist flow. At elevated temperatures, the viscous properties dominate and the asphalt tends to flow or deform. At lower temperatures, the elastic properties dominate and the asphalt tends t resist flow. All types of asphalt, both naturally occurring and synthetically manufactured, are suitable for use in this invention. Naturally occurring asphalt is inclusive of native rock asphalt, lake asphalt, etc. Synthetically manufactured asphalt is often a by-product of petroleum refining operations and includes air-blown asphalt, blended asphalt, cracked or residual asphalt, petroleum asphalt, propane asphalt, straight-run asphalt, thermal asphalt, and the like. Examples of asphalt which are often referred to by their extraction locations include Wyoming Sour, Saudi heavy, West Texas intermediate, California Valley, Venezuela and Canadian.

To increase the use of asphalt, modifiers have been developed, such as agents that decrease the viscosity of the composition, and improve adhesion. Foaming agents add moisture to the asphalt composition, and decrease the viscosity. Waxes are added to asphalt to improve its' flow, based on the belief that the wax provides a lubricating effect. Among the waxes that have been used as asphalt modifiers include montan wax-based composition, and Fischer-Tropsch waxes.

A synthetic rubber, such as a styrene-butadiene-styrene ("SBS") copolymer can be added to a hot melting asphalt mixture to improve the performance of the asphalt, such as to reduce moisture susceptibility, rutting or cracking of the finished asphalt. Sulfur is an agent that is added to facilitate the cross-linking of asphalt, to increase its' strength.

Naidoo et al, in WO 2009/013328 A1 and WO 2009/062925 A1 describe an additive package for modification of asphalt properties (asphalt concrete used for paving road surfaces) that includes a wax component. The examples utilize either Fischer-Tropsch or polyethylene waxes, and carnauba wax is a vegetable wax mentioned in these publications. The additive package is in a range of from 0.2% to 10% by weight, based on the bitumen content of the asphalt composition.

Thus, the hydrogenated oil produced according to the processes of the present invention may be added to an asphalt composition in a quantity sufficient to modify the properties of the asphalt composition. Some of the properties which may be modified include the hardness of the composition, the temperature at which the composition may be prepared, the water resistance of the composition, or a reduction in the amount of volatile compounds released from the asphalt composition while the asphalt composition is being applied to a surface, for example only and not intended as any limitation, such as a roadbed, a runway or a roof.

Although the invention has been described with a certain degree of particularity, it is to be understood that the present disclosure has been made only by the way of illustration, and that numerous changes in construction and arrangement of parts may be resorted to without departing from the spirit and scope of the invention.

We claim:

1. A process to hydrogenate an oil feedstock, the process comprising the steps of:
   introducing a mixture of the oil feedstock and hydrogen into at least one high shear device, wherein the at least one high shear device comprises at least two generators, wherein each of the at least two generators comprises a cylindrical, toothed rotor, and a complementarily-shaped stator; and
   subjecting the mixture to a shear rate of at least 20,000 $s^{-1}$, wherein the shear rate is defined as the tip speed divided by the shear gap, and wherein the tip speed is defined as $\pi Dn$, where D is the diameter of the rotor and n is the frequency of revolution, thus forming a dispersion in the high shear device whereby the hydrogen reacts with the oil feedstock to saturate at least a portion of the oil feedstock, whereby the dispersion comprises hydrogen gas bubbles having an average bubble size of less than about 5 µm.

2. The process as described in claim 1, further comprising the step of removing the hydrogenated oil when the oil feedstock has been hydrogenated to a specific iodine value.

3. The process as described in claim 2, further comprising the step of terminating the process when the feedstock has been hydrogenated to the specific iodine value.

4. The process as described in claim 2, wherein the oil feedstock is selected from the group consisting of animal oil, plant oil and vegetable oil.

5. The process as described in claim 4, wherein the plant oil and vegetable oil is selected from the group consisting of soybean, rape seed, sunflower, safflower, palm, palm kernel, coconut, cottonseed, wheat germ, olive, corn, hemp, crambe, peanut, canola, jatropha plant, castor bean, coriander, hazelnut, hempseed, mango kernel, meadowfoam, palm olein, palm stearin, palm kernel olein, palm kernel stearin, peanut, rice bran, sasanqua, sunflower seed, tsubaki and combinations thereof.

6. The process as described in claim 5, wherein the oil feedstock has not been decolorized.

7. The process as described in claim 5, wherein the oil feedstock oil has not been bleached.

8. The process as described in claim 5, wherein the oil feedstock oil has not been deodorized.

9. The process as described in claim 5, wherein the oil feedstock has not been degummed.

10. The process as described in claim 5, wherein the oil feedstock is selected from the group consisting of unripened vegetables, damaged vegetables and vegetables harvested under unfavorable weather conditions.

11. The process as described in claim 5, wherein the oil feedstock is selected from the group consisting of off-color oil and used cooking oil.

12. The process as described in claim 5, further comprising the step of contacting the dispersion with a hydrogenation catalyst.

13. The process as described in claim 5, wherein the high shear device comprises a catalytic surface.

14. The process as described in claim 6, wherein the iodine value ranges from 0 to about 150.

15. The process as described in claim 14, wherein the iodine value ranges from 0 to about 100.

16. The process as described in claim 15, wherein the iodine value ranges from about 10 to about 70.

17. A process to hydrogenate an oil feedstock, the process comprising the steps of:
   introducing a mixture comprising the oil feedstock and hydrogen into at least one high shear device, wherein the oil feedstock is selected from the group consisting of soybean, rape seed, sunflower, safflower, palm, palm kernel, coconut, cottonseed, wheat germ, olive, corn, hemp, crambe, peanut, canola, jatropha plant, castor bean, coriander, hazelnut, hempseed, mango kernel, meadowfoam, palm olein, palm stearin, palm kernel olein, palm kernel stearin, peanut, rice bran, sasanqua, sunflower seed, tsubaki and combinations thereof; and wherein the oil feedstock oil has not been deodorized;
   wherein the at least one high shear device comprises at least two generators, wherein each of the at least two generators comprises a cylindrical, toothed rotor, and a complementarily-shaped stator; and
   subjecting the mixture to a shear rate of at least 20,000 $s^{-1}$, wherein the shear rate is defined as the tip speed divided by the shear gap, and wherein the tip speed is defined as $\pi Dn$, where D is the diameter of the rotor and n is the frequency of revolution, thus forming a dispersion in the at least one high shear device whereby the hydrogen reacts with the oil feedstock to saturate at least a portion of the oil feedstock, whereby the dispersion comprises hydrogen bubbles gas having an average bubble size of less than about 5 µm.

* * * * *